United States Patent
Jang et al.

(10) Patent No.: US 10,025,323 B2
(45) Date of Patent: Jul. 17, 2018

(54) OIL LEVEL DETECTING APPARATUS AND CONTROL METHOD THEREOF, OIL FLOW DETECTING APPARATUS AND CONTROL METHOD THEREOF, METHOD FOR CONTROL OIL RETURN USING OIL LEVEL AND OIL FLOW

(71) Applicant: SAMSUNG ELECTRONICS CO., LTD., Suwon-si, Gyeonggi-do (KR)

(72) Inventors: Yong Hee Jang, Gunpo-si (KR); Hyo Sang Lee, Osan-si (KR); Hyung Mo Koo, Suwon-si (KR); Suk Ho Lee, Suwon-si (KR); Byoung Guk Lim, Suwon-si (KR); Il Yong Cho, Suwon-si (KR); Byung Ik Choi, Seoul (KR); Jeong Su Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 14/829,747

(22) Filed: Aug. 19, 2015

(65) Prior Publication Data

US 2016/0187173 A1  Jun. 30, 2016

(30) Foreign Application Priority Data

Dec. 30, 2014 (KR) .................. 10-2014-0194089

(51) Int. Cl.
*G05D 7/06* (2006.01)
*G01F 1/684* (2006.01)
(Continued)

(52) U.S. Cl.
CPC .......... *G05D 7/0635* (2013.01); *F01M 11/12* (2013.01); *F04B 39/023* (2013.01); *F04B 51/00* (2013.01);
(Continued)

(58) Field of Classification Search
CPC ...... G05D 7/0635; G05D 7/0623; G05D 9/12; Y10T 137/7306; F01M 11/12;
(Continued)

(56) References Cited

U.S. PATENT DOCUMENTS 4,434,657 A    3/1984  Matsumura et al.
4,591,946 A *  5/1986  Pope .................... G01F 23/263
                                          361/284

(Continued)

FOREIGN PATENT DOCUMENTS

DE    202004016673    3/2005
JP    2000-346502 A   12/2000

(Continued)

OTHER PUBLICATIONS

International Search Report dated Sep. 22, 2015 issued in corresponding International Patent Application PCT/KR2015/006189.

(Continued)

*Primary Examiner* — Mary McManmon
*Assistant Examiner* — Hailey K Do
(74) *Attorney, Agent, or Firm* — Staas & Halsey LLP

(57) ABSTRACT

An apparatus for detecting an oil level and a method for controlling the same, an apparatus for detecting oil flow and a method for controlling the same, and a method for controlling oil return using the detected oil level and the detected oil flow are disclosed. The level of oil stored in a compressor is measured at two or more positions. The frequency comparison scheme using two electrodes can correctly detect the level of oil stored in the compressor, a refrigerant state, and the level of mixed oils, and can determine an internal state of the compressor and a normal or abnormal state of the oil return system, such that the oil return control can be actively controlled. The flow of oil in the oil return pipe is detected so as to determine whether the (Continued)

oil is normally supplied in real time, such that a malfunction of the compressor is prevented and a valve state can be checked. The level of oil stored in the compressor is adjusted not only using the oil level detection result but also the oil flow detection result, and the oil return operation can be controlled.

16 Claims, 20 Drawing Sheets

(51) Int. Cl.
*G01F 23/26* (2006.01)
*G05D 9/12* (2006.01)
*F01M 11/12* (2006.01)
*F04C 23/00* (2006.01)
*F04C 29/02* (2006.01)
*F04B 39/02* (2006.01)
*F04B 51/00* (2006.01)
*F04C 18/02* (2006.01)

(52) U.S. Cl.
CPC ............ *F04C 23/008* (2013.01); *F04C 29/02* (2013.01); *G01F 1/6847* (2013.01); *G01F 23/265* (2013.01); *G01F 23/266* (2013.01); *G01F 23/268* (2013.01); *G05D 9/12* (2013.01); *F04B 2201/0404* (2013.01); *F04C 18/0215* (2013.01); *F04C 2240/809* (2013.01); *F04C 2240/81* (2013.01); *Y10T 137/7306* (2015.04)

(58) Field of Classification Search
CPC ......... F01M 2011/0466; G01F 23/0069; G01F 23/241; G01F 23/26; G01F 23/263; G01F 23/265; G01F 23/266; G01F 23/268; G01F 25/0076; F04C 29/02; F04C 2240/81; F04C 2270/24; F04B 2201/0404
See application file for complete search history.

(56) References Cited

U.S. PATENT DOCUMENTS

| | | | |
|---|---|---|---|
| 4,601,201 A | 7/1986 | Ooota et al. | |
| 5,722,290 A | 3/1998 | Kronberg | |
| 6,337,959 B1 * | 1/2002 | Kwak ................. | G01F 23/265 399/237 |
| 6,681,625 B1 | 1/2004 | Berkcan et al. | |
| 8,733,116 B2 * | 5/2014 | Won .................. | F04B 39/0207 62/193 |
| 2007/0113647 A1 | 5/2007 | Mehlhorn | |
| 2010/0218522 A1 | 9/2010 | Cochran et al. | |
| 2013/0261539 A1 | 10/2013 | King | |

FOREIGN PATENT DOCUMENTS

| | | |
|---|---|---|
| JP | 2001-264446 A | 9/2001 |
| JP | 2014-214913 A | 11/2014 |
| KR | 20-0122952 Y1 | 12/1998 |
| KR | 10-2008-0065191 A | 7/2008 |

OTHER PUBLICATIONS

Extended European Search Report dated Feb. 26, 2018 in European Patent Application No. 15875456.4.

* cited by examiner

OIL LEVEL DETECTING APPARATUS AND CONTROL METHOD THEREOF, OIL FLOW DETECTING APPARATUS AND CONTROL METHOD THEREOF, METHOD FOR CONTROL OIL RETURN USING OIL LEVEL AND OIL FLOW

CROSS-REFERENCE TO RELATED APPLICATIONS

This application claims the benefit of Korean Patent Application No. 10-2014-0194089, filed on Dec. 30, 2014 in the Korean Intellectual Property Office, the disclosure of which is incorporated herein by reference.

BACKGROUND

1. Field

One or more embodiments of the present disclosure relate to an apparatus for detecting an oil level and a method for controlling the same, an apparatus for detecting oil flow and a method for controlling the same, and a method for controlling oil return using the detected oil level and the detected oil flow.

2. Description of the Related Art

A compressor has a structure in which a compression assembly to suction and compress a refrigerant is disposed in an upper part of a casing and an electric assembly is disposed in a lower part of the compression assembly. In this case, the compression assembly and the electric assembly share one rotation shaft, the rotation shaft is rotated based on power generated by the electric assembly and the compression assembly coupled to the rotation shaft is operated through such rotation, thus causing compression.

In this case, supply of oil to bearings, scrolls and the like of the compression assembly is required to facilitate rotation of the compression assembly. Oil is stored in an oil storage portion disposed in a lower part of the casing, and is then supplied to the compression assembly. The oil performs lubrication actions and contributes to cooling of the electric assembly, and control of stable supply of an appropriate amount of oil stored in the compressor is needed.

In order to maintain the appropriate amount of oil in the compressor, an oil level stored in the compressor must be confirmed, and normal operation and appropriate control of the oil return system must be achieved.

However, as configurations of the compressor gradually become more complicated and compressors are used for air-conditioning systems (e.g., a system air-conditioner, multi-air conditioner, etc.), pipes in which oil and working fluids flow are increased in length and control of oil levels in the compressors thus gradually becomes more difficult. In particular, as pipe length increases, an amount of residual oil in pipes increases and the amount of oil stored in the oil storage portion is irregularly and greatly changed during operation although an appropriate amount of oil is supplied in an early stage.

For this reason, there is a need for continuously or periodically checking the oil level in the oil storage portion. Conventionally, the oil level is not confirmed, and the oil return operation is performed at intervals of a predetermined time irrespective of the oil level. However, in this case, the oil return operation is mandatorily performed even when a sufficient amount of oil is present in the oil storage portion, resulting in inefficient operation.

In recent years, in a certain case, the oil return operation may be performed based on the oil level detected through an additional oil level sensor mounted in the compressor casing. The oil level sensor as described above may have the effect of reducing the number of unnecessary oil return operations, thus decreasing energy consumption and increasing the compressor operation time. However, material property (capacitance) is changed according to a refrigerant state and the mixture ratio of oil and refrigerant, such that it becomes difficult to correctly detect the oil level.

SUMMARY

An object of the present disclosure is to provide an oil level detection apparatus configured to more accurately detect the level of oil by measuring the level of oil contained in a compressor at two or more positions, and a method for controlling the same.

Another object of the present disclosure is to provide an oil level detection apparatus for actively controlling the oil return control operation by determining not only an internal state of a compressor but also information indicating whether an oil return system is normal, and a method for controlling the same.

Another object of the present disclosure is to provide an oil level detection apparatus for determining in real time whether oil is normally supplied by detecting flow of oil contained in an oil return pipe, preventing a malfunction of a compressor, and checking a valve state, and a method for controlling the same.

Another object of the present disclosure is to provide a method for controlling an oil return operation that adjusts the level of oil contained in a compressor using the oil level and the oil flow detection result, and controls an oil return operation.

The objects of the present disclosure can be achieved by providing an oil level detection apparatus including: an oil level sensor installed into a compressor so as to measure a capacitance value changed according to a level of oil contained in the compressor at a plurality of positions; a signal processor configured to convert a plurality of capacitance values measured by the oil level sensor into frequency signals; and a controller configured to determine the level of oil on the basis of the frequency signals received from the signal processor.

The oil level sensor may be installed at an oil storage portion provided below the compressor, and may include first and second detection portions vertically spaced apart from each other by a predetermined distance within the oil storage portion.

The first detection portion may include a first reference electrode and a first detection electrode arranged at both sides of the first reference electrode, and may determine whether the level of oil is equal to or higher than a first reference level.

The first detection electrode may include: a first base portion spaced apart from one side of the first reference electrode by a predetermined distance; and a first augmentation portion spaced apart from the other side of the first reference electrode by a predetermined distance.

The first detection portion may output not only a value corresponding to capacitance between the first reference electrode and the first base portion, but also a value corresponding to capacitance between the first reference electrode and the first augmentation portion.

The second detection portion may include a second reference electrode spaced apart from the first reference electrode by a predetermined distance and a second detection electrode disposed at both sides of the second reference electrode, and may determine whether the level of oil is between the first reference level and the second reference level or is less than the second reference level.

The second detection electrode may include a second base portion spaced apart from one side of the second reference electrode by a predetermined distance, and a second augmentation portion spaced apart from the other side of the second reference electrode by a predetermined distance.

The second detection portion may output not only a value corresponding to capacitance between the second reference electrode and the second base portion, but also a value corresponding to capacitance between the second reference electrode and the second augmentation portion.

The signal processor may convert voltage signals corresponding to a plurality of capacitance values measured by the oil level sensor into trigger frequency signals, and may output the trigger frequency signals.

The controller may compare a difference among a plurality of sensor output values generated from the oil level sensor with a reference value, and may determine the level of oil according to the result of comparison.

The reference value may be established to determine whether the level of oil contacting the oil level sensor is in any one of a normal range, an excessive range, or an insufficient range.

The reference value may include: a first reference value for determining whether the level of oil is between the first detection portion and the second detection portion; and a second reference value for determining whether the level of oil is higher than the first detection portion.

The controller may determine the level of oil using the first reference value and the second reference value.

The controller may determine that the level of oil is in the normal range when the difference among the sensor output values generated from the oil level sensor is higher than the first reference value.

The controller may determine that the level of oil is in the excessive range when the difference among the sensor output values generated from the oil level sensor is less than the second reference value.

The controller may determine that the level of oil is in the insufficient range when the difference among the sensor output values generated from the oil level sensor is between the first reference value and the second reference value.

The controller may compare the difference among the plurality of sensor output values generated from the oil level sensor with the reference value, and may determine a state of the oil according to the result of comparison.

The reference value may be established to determine whether a state of the oil contacting the oil level sensor is a liquid refrigerant, a bubble refrigerant, or a gaseous refrigerant.

In accordance with another aspect of the present disclosure, an oil level detection control method includes: measuring a capacitance value changed according to a level of oil contained in a compressor at a plurality of positions; converting the plurality of measured capacitance values into frequency signals; and determining the level of oil not only using output values of the converted frequency signals but also using a reference value.

In accordance with another aspect of the present disclosure, an oil flow detection apparatus includes: a heating unit installed in a pipe through which oil of an accumulator return to a compressor, configured to heat the pipe; a temperature measurement unit configured to measure a pipe temperature changed according to the flow of oil existing in the pipe; and a controller configured to monitor a variation of the pipe temperature measured by the temperature measurement unit, and determine the presence or absence of the flow of oil on the basis of the monitoring result.

The oil flow detection apparatus may further include: a valve controlled to allow the oil to return to the compressor, wherein the temperature measurement unit measures a pipe surface temperature changed according to the flow of oil existing in the pipe.

The controller may compare a pipe temperature variation measured when the valve is switched on or off during heating with a reference temperature, and may determine the presence or absence of the flow of oil according to the result of comparison.

The controller may determine the presence of the flow of oil when the pipe temperature variation is less than the reference temperature.

The controller, when the flow of oil is not detected, may switch the valve on or off so as to determine the presence or absence of a malfunction of the valve.

The controller may compare a pipe temperature variation measured when the valve is switched on or off with a reference temperature, and may determine the presence or absence of a malfunction of the valve according to the result of comparison.

The controller, if the pipe temperature variation measured when the valve is switched off is higher than the reference temperature during heating, may determine that the valve is in a normal state.

The controller, if the pipe temperature variation measured when the valve is switched off during heating, may determine that the valve is in a malfunction state.

In accordance with another aspect of the present disclosure, an oil flow detection control method includes: heating a pipe through which oil of an accumulator returns to a compressor; measuring a pipe temperature changed according to the flow of oil existing in the pipe; and comparing the measured pipe temperature with a reference temperature, and determining the presence or absence of the flow of oil according to the result of comparison.

The oil flow detection control method may further include: switching a valve on so as to return the oil to the compressor, wherein the measuring of the pipe temperature includes measuring a pipe surface temperature changed according to the flow of oil existing in the pipe when the valve is switched on.

The determining of the presence or absence of the flow of oil may include: if the pipe temperature variation measured when the valve is switched on during heating is less than the reference temperature, determining that the oil flows into the pipe.

The oil flow detection control method may further include: switching the valve off so as to determine the presence or absence of a malfunction of the valve, wherein the measuring of the pipe temperature includes: measuring a pipe surface temperature changed when the valve is switched off.

The determining of the presence or absence of the malfunction of the valve may include: if the pipe temperature variation measured when the valve is switched off is less than the reference temperature, determining the presence of the malfunction of the valve.

In accordance with another aspect of the present disclosure, an oil return operation control method includes: detecting a level of oil stored in a compressor; if the detected level of oil is an insufficient level, performing an oil return control operation in which a valve installed into a pipe through which the oil of an accumulator returns to the compressor is controlled so as to return the oil; determining whether the oil flows into the pipe through the oil return control operation; if the flow of oil is not detected, repeating the oil return control operation a reference number of times; and if the number of the repeated oil return control operations is higher than the reference number of times, entering an operation for returning the oil when the level of oil is the insufficient level.

The oil return operation control method may further include: if the level of oil is the insufficient level, checking a state of the valve, and controlling the valve in such a manner that the returning of the oil is achieved according to the state of the valve.

The oil return operation control method may further include: if the flow of oil is not detected when the valve is switched off, switching the valve on in such a manner that returning of the oil is performed.

The oil return operation control method may further include: after completion of the oil return operation, detecting the level of oil stored in the compressor; and if the level of oil is the insufficient level, outputting a signal for checking a system.

As is apparent from the above description, the oil level detection apparatus and a method for controlling the same, the oil flow detection apparatus and a method for controlling the same, and a method for controlling an oil return operation using the oil level and the oil flow detection result according to the embodiments of the present disclosure can measure the level of oil contained in a compressor at two or more positions, and can more correctly detect the oil level irrespective of a change of material property as compared to the conventional method. Therefore, an appropriate compressor oil level is maintained, such that operation efficiency of the compressor can be increased, power consumption of the compressor can be prevented from increasing due to excess oil, and malfunction of the compressor can also be prevented from occurring due to an insufficient amount of oil. In addition, the internal state of the compressor and information as to whether the oil return system is normally operated are determined such that the oil return system can be actively controlled.

Besides, flow of oil contained in the oil return pipe is detected to determine whether oil is normally supplied in real time, such that a malfunction of the compressor can be prevented and the valve state can be checked. In addition, the level of oil contained in the compressor is adjusted using the detected oil level and the oil flow detection result. If the number of times for adjusting the oil level exceeds a reference number of times, the oil return operation is controlled such that the operation characteristics of the compressor can be improved due to reduction in the number of oil return operations, resulting in prevention of user inconvenience.

In accordance with another aspect of the present disclosure, an oil level sensing apparatus that is configured to be disposed in an oil storage portion of a compressor of an air conditioning unit is provided. The apparatus may include an oil level sensor comprising first and second detection portions spaced apart from each other by a predetermined vertical distance to measure a capacitance value that changes according to a level of oil contained in the oil storage portion, and a controller configured to determine the level of oil based on the measured capacitance value.

In accordance with another aspect of the present disclosure, an oil level sensor is provided. The oil level sensor may include a first detection electrode comprising a first reference portion, a first base portion, and a first augmentation portion, wherein the first base portion and the first augmentation portion are respectively disposed at each side of the first reference portion and a second detection electrode comprising a second reference portion, a second base portion, and a second augmentation portion, wherein the second base portion and the second augmentation portion are respectively disposed at each side of the second reference portion, wherein the second detection electrode is spaced apart from the first detection electrode by a predetermined vertical distance.

In accordance with another aspect of the present disclosure, an oil level sensing apparatus that is configured to be disposed in an oil storage portion of a compressor of an air conditioning unit is provided. The apparatus may include a first detection portion comprising a first electrode disposed in the oil storage portion, a second detection portion comprising a second electrode disposed in the oil storage portion, the second detection portion being spaced apart from the first detection portion by a predetermined vertical distance and a connection portion to electrically interconnect the first detection portion and the second detection portion.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the exemplary embodiments of the present disclosure, examples of which are illustrated in the accompanying drawings.

Figure 1:
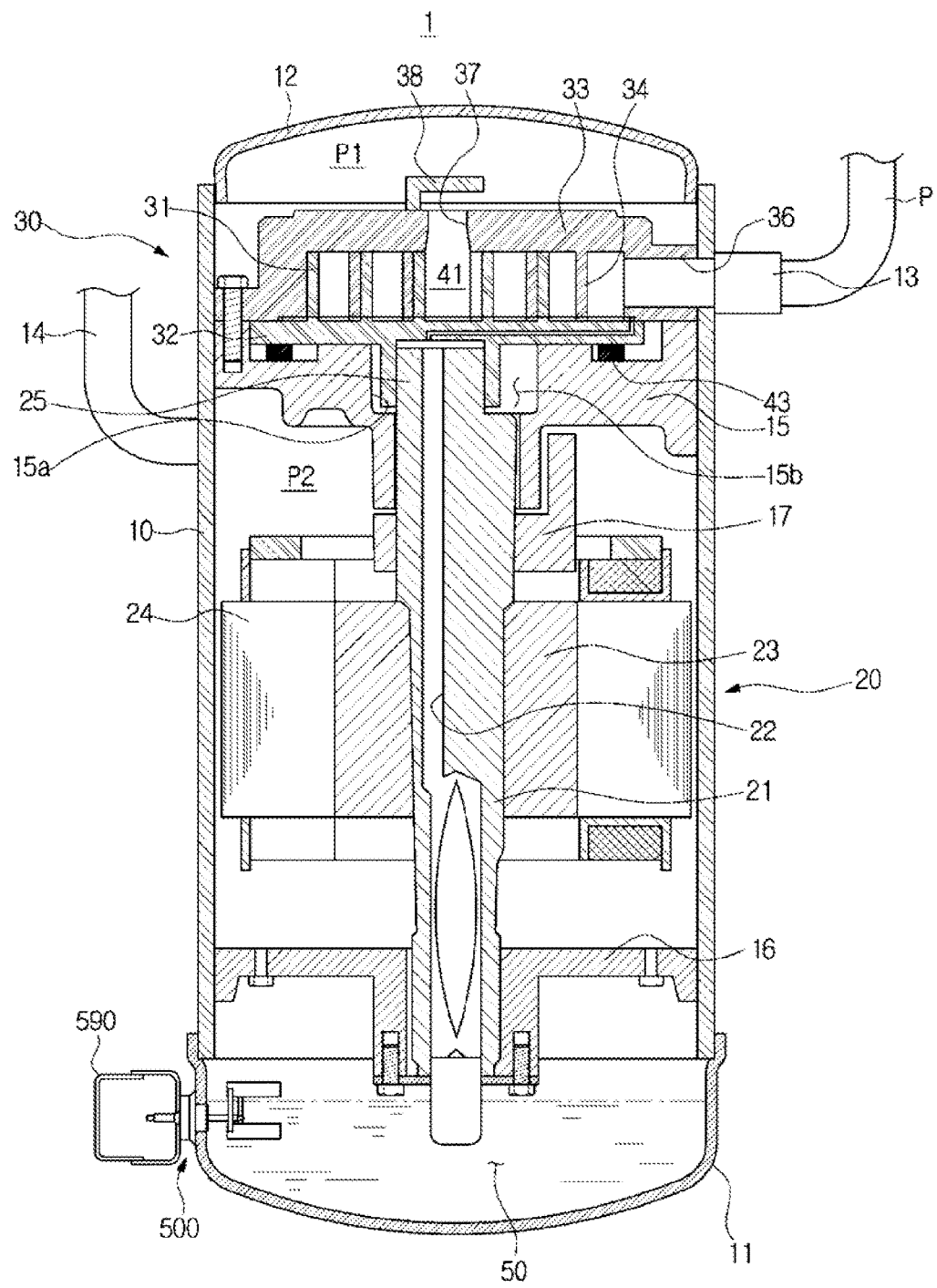
FIG. 1 is a cross-sectional view illustrating a compressor according to an embodiment of the present disclosure.

FIG. 1 is a cross-sectional view illustrating a compressor according to an embodiment of the present disclosure.

Referring to FIG. 1, the compressor 1 includes a casing 10 having a closed internal space to form an outer appearance, and an electric assembly 20 and a compression assembly 30 installed in the casing 10.

A suction inlet 13 through which a refrigerant is introduced is mounted to one side of the casing 10, and a discharge outlet 14 through which the compressed refrigerant received through the inlet 13 is discharged to the outside is mounted on a side of the casing 10. An upper cap 12 may be mounted to an upper part of the casing 10 and a lower cap 11 may be mounted to a lower part of the casing 10 such that the internal space of the casing 10 can be closed.

The electric assembly 20 may include a cylindrical stator 24 pressed in a lower part of the casing 10, and a rotor 23 rotatably mounted to the center part of the stator 24. A balance weight 17 capable of adjusting rotation imbalance during rotation of the rotor 23 may be installed at upper and lower parts of the rotor 23.

An upper flange 15 and a lower flange 16 may be respectively fixed to an upper inner part and a lower inner part of the casing 10, and the electric assembly 20 may be disposed between the upper flange 15 and the lower flange 16.

A rotation shaft 21 is coupled between the upper flange 15 and the lower flange 16. A rotational force generated from the electric assembly 20 is applied to a turning scroll 32 of the compression assembly 30. An eccentric portion 25 eccentrically spaced from the center point of the rotation shaft 21 may be arranged at an upper end of the rotation shaft 21.

A through hole 15a through which the rotation shaft 21 passes may be formed at the center of the upper flange 15, and an oil reservoir portion 15b configured to accommodate oil suctioned from the rotation shaft 21 may be formed in the vicinity of the through hole 15a. An oil movement pipe 22 may be formed in the rotation shaft 21 in a longitudinal direction of the rotation shaft 21, and an oil pump (not shown) may be mounted to a lower end of the oil movement pipe 22.

The compression assembly 30 may include a turning scroll 32 and a fixed scroll 33. The rotation shaft 21 is inserted into the turning scroll 32 in a manner that the turning scroll 32 operates by the rotation shaft 21, and a spiral-shaped turning scroll wrap 31 is formed at the top surface of the turning scroll 32. The fixed scroll wrap 34 is formed at the bottom surface of the fixed scroll 33 in a manner that the fixed scroll 33 is meshed with the turning scroll wrap 31 of the turning scroll 32.

The turning scroll 32 is rotatably installed at the top surface of the upper flange 15, and the fixed scroll 33 is fixed to the top surface of the upper flange 15. The turning scroll 32 and the fixed scroll 33 are respectively meshed with the turning scroll wrap 31 and the fixed scroll wrap 32 so as to form a compression chamber 41. An Oldham's ring 43 may be interposed between the turning scroll 32 and the upper flange 15 so as to circle the turning scroll simultaneously while preventing rotation of the turning scroll 32.

The internal space of the casing 10 is classified into an upper part P1 and a lower part P2 by the upper flange 15 and the fixed scroll 33, and the upper part P1 and the lower part P2 are in a high-pressure state.

An inlet 36 for communication of a gas suction pipe P coupled to the inlet 13 is formed at one side of the fixed scroll 33. An outlet 37 through which refrigerant compressed by the compression chamber 41 is discharged to the upper part P1 of the casing 10 is formed at the center of the top surface of the fixed scroll 33. In this case, a valve portion 38 for opening/closing the outlet 37 may be provided to the outlet 37 so as to prevent back flow of the discharged refrigerant gas. An oil storage portion 50 for storing oil for lubrication may be provided at a lower part of the casing 10.

If a power-supply voltage is applied to the compressor 1, the rotation shaft 21 rotates with the rotor 23, and the turning scroll 32 coupled to an upper end of the rotation shaft 21 rotates. The turning scroll 32 may rotate using an eccentric distance from the center of the rotation shaft 21 to the center of the eccentric portion 24 as a turning radius. In this case, rotation of the turning scroll 32 is prevented by the Oldham's ring 43.

If the turning scroll 32 rotates, the fixed scroll 33 rotates by the fixed scroll wrap 34 meshed with the turning scroll wrap 31 of the turning scroll 32, and the compression chamber 41 is interposed between the turning scroll wrap 31 and the fixed scroll wrap 34. The compression chamber 41 moves to the center part by successive turning movement of the turning scroll 32, such that volume is reduced and the suctioned refrigerant is compressed.

In this case, oil disposed at a lower end of the casing 10 is pumped by the oil pump (not shown) mounted to the lower end of the rotation shaft 21, and oil moves upward through the oil movement pipe 22 of the rotation shaft 21.

Some of the oil flowing to the upper end of the rotation shaft 21 is supplied to the through hole 15a of the upper flange 15, and the remaining oil is scattered from the upper end of the rotation shaft 21 and accommodated in the oil reservoir portion 15b of the upper flange 15.

In order to facilitate turning movement on the condition that the fixed scroll 33 is meshed with the turning scroll 32, oil needs to be stably supplied to a surface of the bearing interposed between the fixed scroll 33 and the turning scroll 32.

Oil stored in the oil storage portion 50 disposed at a lower part of the casing 10 moves upward through the oil movement pipe 22 formed in a longitudinal direction of the rotation shaft 21. Oil moving upward through the oil movement pipe 22 is supplied to the bearing surface between the fixed scroll 33 and the turning scroll 32, such that damage caused by friction between the fixed scroll 33 and the turning scroll 32 can be prevented.

Oil stored in the oil storage portion 50 may pass through the compressor 1 according to operation of the compressor 1. Oil discharged from the compressor 1 circulates in a cooling system composed of a condenser, an expansion valve, an evaporator, etc. along with refrigerant, and then returns to the compressor 1.

However, if a connection pipe for interconnecting an indoor unit and an outdoor unit in an air-conditioning system (e.g., a large-scale air-conditioner or a multi-air conditioning system) having the compressor 1 increases in length, the amount of residual oil present in the connection pipe increases. Therefore, although an appropriate amount of oil is supplied to the air-conditioner installed in an early stage, the amount of oil stored in the oil storage portion 50 of the compressor 1 may be irregularly changed during operation of the air-conditioner.

In order to prevent damage caused by friction of the bearing surface interposed between the fixed scroll 33 of the compressor 1 and the turning scroll 32, if it is determined that the amount of oil stored in the compressor 1 is equal to or less than a predetermined level, the oil return operation for collecting oil in the compressor 1 must be performed. The oil return operation may be performed at intervals of a predetermined time irrespective of the level of oil contained in the compressor 1. However, the oil return operation is performed even when there is a sufficient amount of oil, and unnecessary energy consumption occurs, resulting in inefficiency in operation.

Therefore, the level of oil stored in the compressor 1 is detected, so that the oil return operation is performed only when there is an insufficient amount of oil.

For this purpose, the oil level sensor 500 for detecting the level of oil stored in the compressor 1 may be mounted to at a lower part of the compressor 1 (i.e., at one side of the oil storage portion 50). A terminal cover 590 may be provided at the outside of the oil level sensor 500.

If the oil level detected by the oil level sensor 500 is equal to or less than a predetermined level, the oil return control may be actively controlled through the oil return flow passage or the oil return operation may be performed.

As described above, the oil level sensor 500 maintains an appropriate level of oil during operation of the compressor 1, such that the compressor 1 is normally operated.

The oil level sensor 500 will hereinafter be described with reference to FIG. 2.

Figure 2:
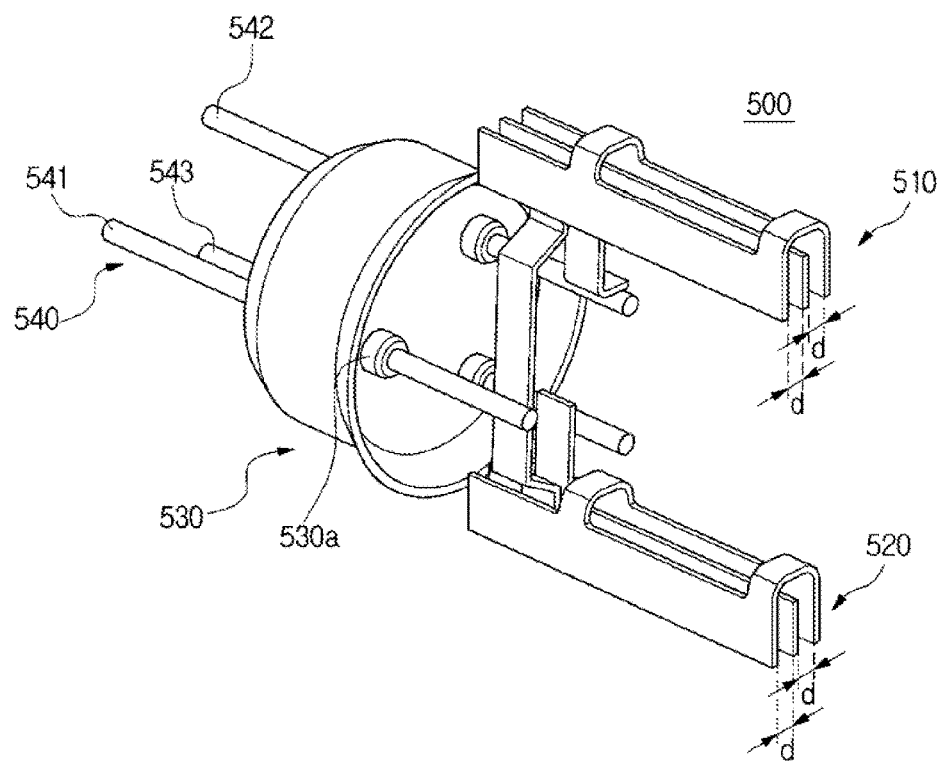
FIG. 2 is a perspective view illustrating an oil level sensor installed in the compressor according to an embodiment of the present disclosure.

FIG. 2 is a perspective view illustrating the oil level sensor installed in the compressor according to an embodiment of the present disclosure.

Referring to FIG. 2, the oil level sensor 500 disposed in a lower oil storage portion 50 of the compressor 1 may include a first detection portion 510, a second detection portion 520, a cap portion 530, and a connection portion 540.

The first detection portion 510 includes an electrode located at an upper part so as to detect the level of oil stored in the oil storage portion 150, and may detect the presence or absence of oil stored in the upper electrode using the value of capacitance that changes according to whether or not the electrode contacts the oil.

In more detail, in a first case in which the oil level is less than a first reference level (Level1) and in a second case in which the oil level is equal to or higher than the first reference level (Level1), the first detection portion 510 may output different capacitance values. It is determined whether the oil level is equal to or higher than the first reference level (Level1) using the capacitance values generated from the first detection portion 510.

The second detection portion 520 is spaced from the first detection portion 510 by a predetermined distance and includes an electrode located at a lower part so as to detect the level of oil stored in the oil storage portion 150. It is determined whether the oil is present in a lower electrode using a capacitance value that changes according to whether the second detection portion 520 contacts the oil.

In more detail, in a first case in which the oil level is less than a second reference level (Level2) and in a second case in which the oil level is equal to or higher than the second reference level (Level2), the second detection portion 520 may output different capacitance values. Therefore, it is determined whether the oil level is between the first reference level (Level1) and the second reference level (Level2) using the capacitance value generated from the second detection portion 520, or is less than the second reference level (Level2).

In this case, the first reference level (Level1) is higher than the second reference level (Level2). The first reference level (Level1) is the highest oil level at which the compressor 1 can normally operate, and the second reference level (Level2) is the lowest oil level at which the compressor 1 can normally operate.

The first detection portion 510 and the second detection portion 520 are comprised of two pole plates, respectively. Respective electrodes may be comprised of capacitors having the same or different capacitances. The first detection portion 510 and the second detection portion 520 will hereinafter be described with reference to FIGS. 3 to 10.

The cap portion 530 may be coupled to the oil storage portion 50 of the compressor 1, and the first detection portion 510 and the second detection portion 520 are coupled to the cap portion 530. A plurality of connection portions 540 may pass through the cap portion 530.

If the cap portion 530 is formed of a conductive material, an insulation member 530a for electrical insulation and sealing between the cap portion 530 and the connection portion 540 may also be arranged at a contact portion between the connection portion 540 and the cap portion 530.

That is, the insulation member 530a may be inserted between the connection portion 540 and the cap portion 530.

The connection portion 540 is a signal transmission portion having a predetermined length so as to electrically interconnect the first detection portion 510 and the second detection portion 520, and may include a plurality of connection terminals (e.g., 541, 542, 543).

In addition, the connection portion 540 may include a first connection terminal 541 coupled to the first and second reference portions (511, 521) corresponding to reference electrodes; a second connection terminal 542 coupled to a first base portion 512 corresponding to a detection electrode of the first detection portion 510; and a third connection terminal 543 coupled to a second base portion 522 corresponding to a detection electrode of the second detection portion 520.

The first detection portion 510 and the second detection portion 520 are coupled to one end of the first connection terminal 541, one end of the second connection terminal 542, and one end of the third connection terminal 543. A signal processor may be coupled to the other end of the first connection terminal 541, the other end of the second connection terminal 542, and the other end of the third connection terminal 543. The signal processor will hereinafter be described with reference to FIG. 11.

The first connection terminal 541 acting as a reference electrode is always grounded to a ground terminal (Ground), and a PWM voltage is applied to the second connection terminal 542 and the third connection terminal 543. Therefore, the charging/discharging times based on the received voltage may be changed according to not only capacitance between the first connection terminal 541 and the second connection terminal 542, but also capacitance between the first connection terminal 541 and the third connection terminal 543.

Figure 3:
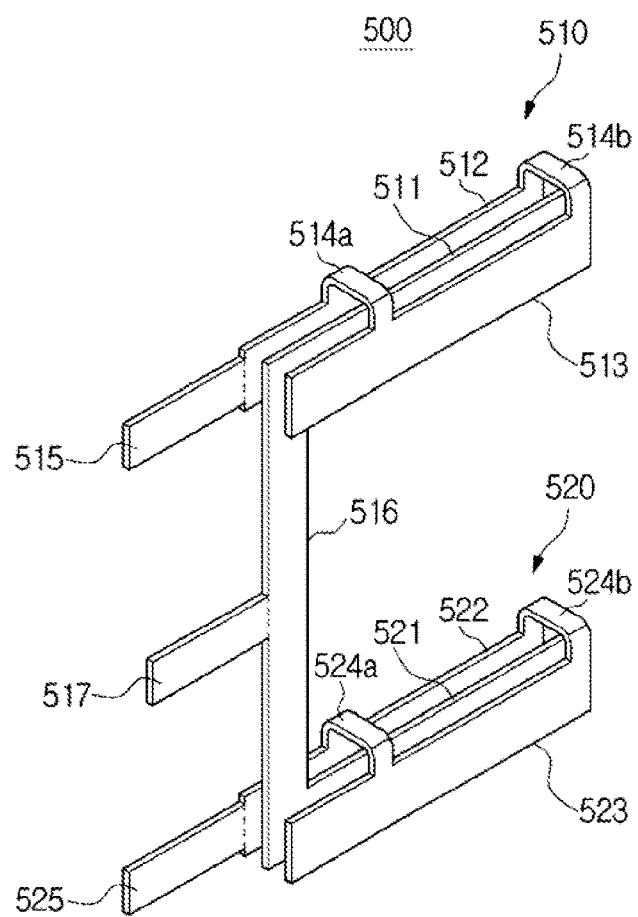
FIG. 3 is a perspective view illustrating an oil level sensor according to an embodiment of the present disclosure.
Figure 4:
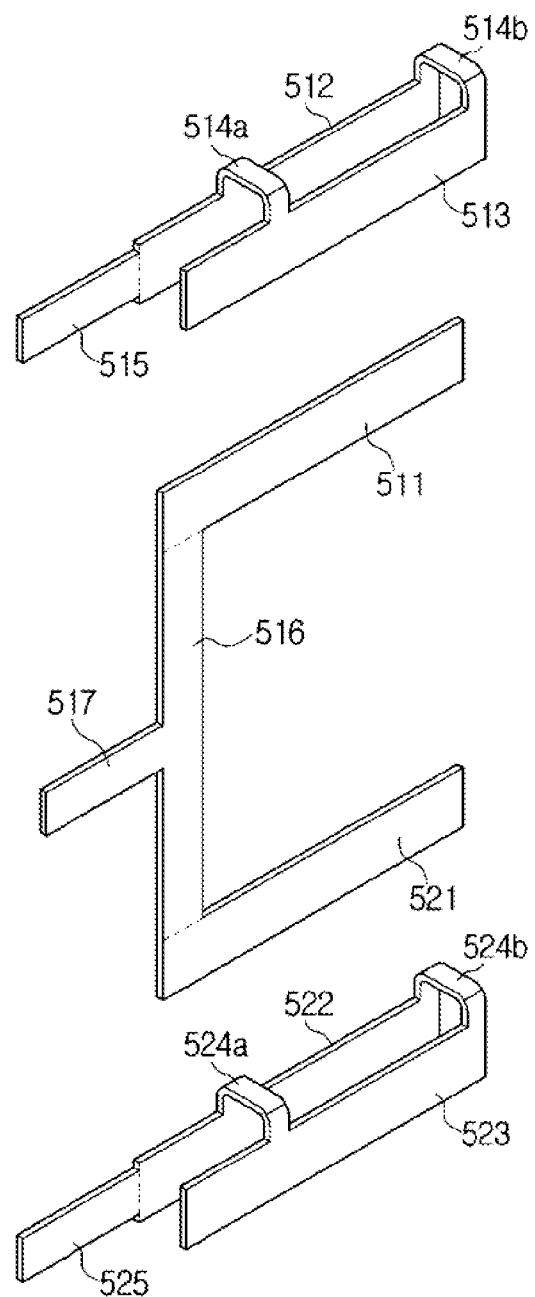
FIG. 4 is an exploded perspective view illustrating an oil level sensor according to an embodiment of the present disclosure.

FIG. 3 is a perspective view illustrating a coupling state of the oil level sensor according to an embodiment of the present disclosure. FIG. 4 is an exploded perspective view illustrating the oil level sensor according to an embodiment of the present disclosure.

Referring to FIGS. 3 and 4, the first detection portion 510 may include a first reference portion 511 corresponding to a first reference electrode; and a first base portion 512 and a first augmentation portion 513 corresponding to the first detection electrode.

The first base portion 512 and the first augmentation portion 513 are respectively disposed at both sides of the first reference portion 511 on the basis of the first reference portion 511 interposed therebetween. The first base portion 512 and the first augmentation portion 513 may be spaced apart from the first reference portion 511 by a predetermined distance (d), as shown in FIG. 2.

The first base portion 512 and the first augmentation portion 513 may enclose the first reference portion 511. The first reference portion 511, the first base portion 512, and the first augmentation portion 513 may be arranged parallel to each other.

The first base portion 512 and the first augmentation portion 513 may be symmetrical with each other on the basis of the first reference portion 511, and may have the same size. That is, horizontal and vertical lengths of the first base portion 512 are identical to those of the first augmentation portion 513, each of the first base portion 512 and the first augmentation portion 513 is configured in the form of a plate, and the size of the first base portion 512 is identical to the size of the first augmentation portion 513. In addition, the first reference portion 511 may also be configured in the form of a plate, and may be identical in size to the first base portion 512.

The first base portion 512 and the first augmentation portion 513 are respectively disposed at both sides of the first reference portion 511, and capacitance generated in the first augmentation portion 513 may be added to capacitance generated in the first base portion 512, such that capacitance generated in the first detection portion 510 may increase and precision of oil detection may also be increased.

In addition, the first base portion 512 and the first augmentation portion 513 may be electrically interconnected by the first connection members (514a, 514b).

The first connection members (514a, 514b) may be arranged to maintain a constant distance between the first base portion 512 and the first augmentation portion 513. The first connection members (514a, 514b) may be implemented as one or more elements.

The first detection portion 510 may include the first augmentation portion 513 integrated with the first base portion 512, and may further include a first coupling terminal 515 electrically and mechanically coupled to the second connection terminal 542 of the connection portion 540.

The first coupling terminal 515 may be extended from one end of the first base portion 512 to the outside.

The second detection portion 520 may include a second reference portion 521 corresponding to the second reference electrode; and a second base portion 522 and a first augmentation portion 523 corresponding to the second detection electrode.

The second base portion 522 and the second augmentation portion 523 may be respectively arranged at both sides of the second reference portion 521 on the basis of the second reference portion 521, and may be spaced apart from the second reference portion 521 by a predetermined distance (d), as shown in FIG. 2.

The second base portion 522 and the second augmentation portion 523 may enclose the second reference portion 521, and the second reference portion 521, the second base portion 522, and the second augmentation portion 523 may be arranged parallel to each other.

The second base portion 522 and the second augmentation portion 523 may be symmetrical with each other on the basis of the second reference portion 521, and may have the same size. That is, horizontal and vertical lengths of the second base portion 522 are identical to those of the second augmentation portion 523, each of the second base portion 522 and the second augmentation portion 523 is configured in the form of a plate, and the size of the second base portion 522 is identical to the size of the second augmentation portion 523. In addition, the second reference portion 521 may also be configured in the form of a plate, and may be identical in size to the second base portion 522.

As described above, the second base portion 522 and the second augmentation portion 523 are respectively arranged at both sides of the second reference portion 521, and capacitance generated in the second augmentation portion 523 is added to capacitance generated in the second base portion 522, such that capacitance generated in the second detection portion 520 may increase and the precision of the oil detection may also increase.

In addition, the second base portion 522 and the second augmentation portion 523 may be electrically interconnected by the second connection members (524a, 524b).

The second connection members (524a, 524b) may be arranged to maintain a constant distance between the second base portion 522 and the second augmentation portion 523. The second connection members (524a, 524b) may be implemented as one or more elements.

The second detection portion 520 may include the second augmentation portion 523 integrated with the second base portion 522, and may further include a second coupling terminal 525 electrically and mechanically coupled to the third connection terminal 543 of the connection portion 540.

The second coupling terminal 525 may be extended from one end of the second base portion 522 to the outside.

In addition, the oil level sensor 500 may be disposed between the first reference portion 511 of the first detection portion 510 and the second reference portion 521 of the second detection portion 520. The oil level sensor 500 may further include a separation member 516 arranged to contact or connect the first reference portion 511 and the second reference portion 521 so that the separation member 516 can be electrically coupled to the first reference portion 511 and the second reference portion 521.

The separation portion 516 is maintained on the condition that the first reference portion 511 is spaced from the second reference portion 521 by a predetermined distance.

In addition, the separation member 516, the first reference portion 511, and the second reference portion 521 may be integrated into one shape, e.g., '⊂' shape.

The oil level sensor 500 may further include a reference terminal electrically and mechanically coupled to the separation member 516.

The reference terminal 517 may protrude outward from one side of the separation member 516, and may be integrated with the separation member 516.

In addition, the reference terminal 517 may be electrically and mechanically coupled to the first connection terminal 541 of the connection portion 540. The reference terminal 517 may output the input signal received from the first connection terminal 541 of the connection portion 540 to the first reference portion 511 and the second reference portion 521.

The distance (d) between the first reference portion 511 and the first base portion 512, the distance (d) between the first reference portion 511 and the first augmentation portion 513, the distance (d) between the second reference portion 521 and the second base portion 522, and the distance (d) between the second reference portion 521 and the second augmentation portion 523 may be identical or similar to one another.

In this case, the first reference portion 511 and the second reference portion 521 corresponding to reference electrodes may receive an input signal from the controller, and the first base portion 512 and the second base portion 522 may output capacitance values.

Figure 5:
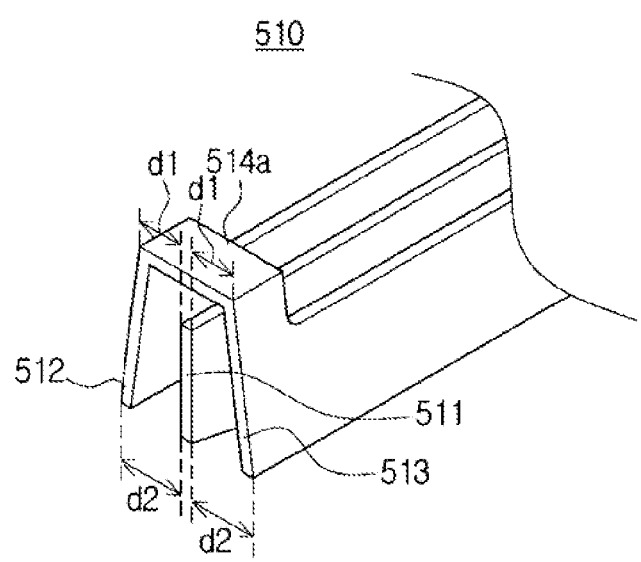
FIG. 5 is a perspective view illustrating an oil level sensor according to another embodiment of the present disclosure.

FIG. 5 is a perspective view illustrating an oil level sensor according to another embodiment of the present disclosure. In FIG. 5, the same reference numbers and names as those of FIG. 3 will be used to refer to the same or like parts wherever possible, and thus a detailed description thereof will be omitted. Hereinafter, details of only the first detection portion 510 different from the oil level sensor 500 shown in FIG. 3 will be focused upon.

The first detection portion 510 may include a first reference portion 511 corresponding to a reference electrode; and a first base portion 512 and a first augmentation portion 513 corresponding to detection electrodes.

The first base portion 512 and the first augmentation portion 513 may be respectively disposed at both sides of the first reference portion 511 with the first reference portion 511 interposed therebetween.

The first base portion 512 and the first augmentation portion 513 may have the same size. That is, horizontal and vertical lengths of the first base portion 512 are identical to those of the first augmentation portion 513, each of the first base portion 512 and the first augmentation portion 513 is configured in the form of a plate, and the size of the first base portion 512 is identical to the size of the first augmentation portion 513. In addition, the first reference portion 511 may also be configured in the form of a plate, and may be identical in size to the first base portion 512.

The first base portion 512 and the first augmentation portion 513 may be symmetrical with each other on the basis of the first reference portion 511, and the first base portion 512 and the first augmentation portion 513 are not arranged parallel to each other.

In more detail, a first distance (d1) between one end of the first reference portion 511 and one end of the first base portion 512 adjacent to one end of the first reference portion 511 may be different from a second distance (d2) between the other end of the first reference portion 511 and the other end of the first base portion 513 adjacent to the first reference portion 511. That is, the first distance (d1) is shorter than the second distance (d2).

In addition, the first distance (d1) between one end of the first reference portion 511 and the first augmentation portion 513 adjacent to one end of the first reference portion 511 may be different from the second distance (d2) between the other end of the first reference portion 511 and the other end of the first augmentation portion 513 adjacent to the first reference portion 511. That is, the first distance (d1) is shorter than the second distance (d2).

That is, as the distance from one side to the other side of the first reference portion 511 gradually increases on the basis of the first reference portion 511, the distance from the first reference portion 511 to the first base portion 512 gradually increases. In addition, as the distance from one side to the other side of the first reference portion 511 increases on the basis of the first reference portion 511, the distance from the first reference portion 511 to the first augmentation portion 513 gradually increases.

As described above, a cross section of the first detection portion 510 is formed in a trapezoidal shape, and the first base portion 512 has a constant slope on the basis of the first reference portion 511. In addition, the first augmentation portion 513 may have a constant slope on the basis of the first reference portion 511.

That is, the first base portion 512 and the first augmentation portion 513 may enclose the first reference portion 511. The first reference portion 511, the first base portion 512, and the first augmentation portion 513 are not arranged parallel to one another.

As described above, the first base portion 512 and the first augmentation portion 513 are respectively disposed at both sides of the first reference portion 511, such that capacitance generated in the first detection portion 510 may increase and precision of oil detection may also increase.

In addition, the first base portion 512 and the first augmentation portion 513 may have a predetermined slope on the basis of the first reference portion 511, such that oil formation among the first reference portion 511, the first base portion 512, and the first augmentation portion 511 is prevented.

The second detection portion not shown in FIG. 5 may be identical in structure to the first detection portion 510.

Figure 6:
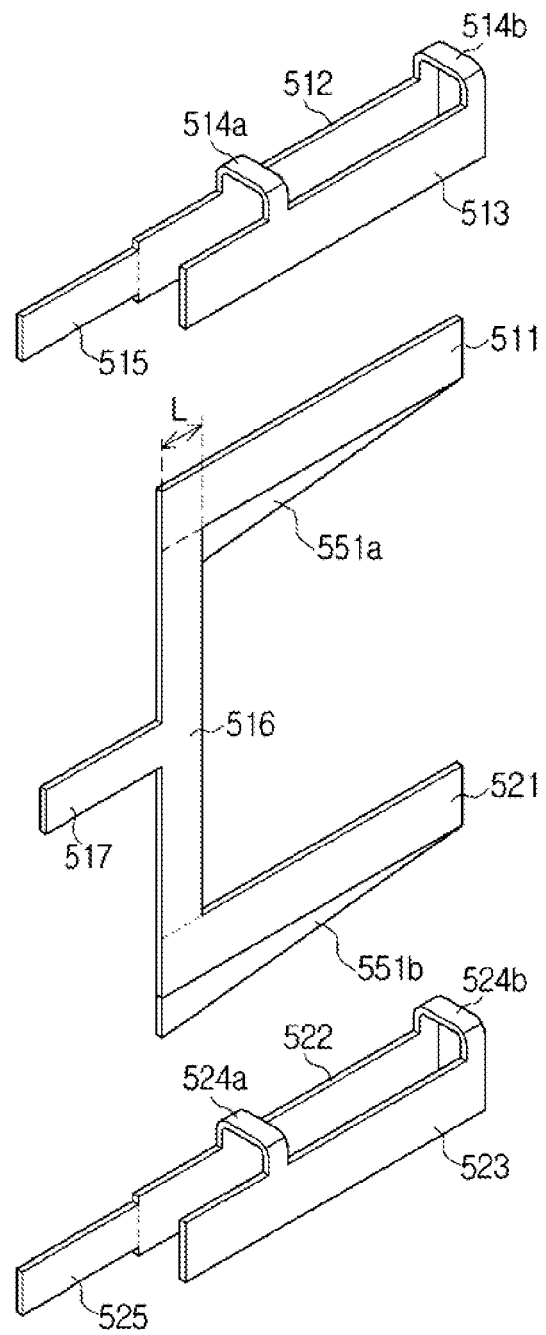
FIG. 6 is an exploded perspective view illustrating an oil level sensor according to another embodiment of the present disclosure.

FIG. 6 is an exploded perspective view illustrating an oil level sensor according to another embodiment of the present disclosure. In FIG. 6, the same reference numbers and names as those of FIG. 4 will be used to refer to the same or like parts wherever possible, and thus a detailed description thereof will be omitted.

In FIG. 6, the oil level sensor 500 may further include flow portions 550 (551*a*, 551*b*). The first detection portion 510 may include a first reference portion 511 corresponding to a first reference electrode; and a first base portion 512 and a first augmentation portion 513 corresponding to first detection electrodes.

The first base portion 512 and the first augmentation portion 513 may be respectively arranged at both sides of the first reference portion 511 on the basis of the first reference portion 511 interposed therebetween, and may be spaced apart from the first reference portion 511 by a predetermined distance.

The first base portion 512 and the first augmentation portion 513 may be symmetrical with each other on the basis of the first reference portion 511, and may have the same size. That is, horizontal and vertical lengths of the first base portion 512 are identical to those of the first augmentation portion 513, each of the first base portion 512 and the first augmentation portion 513 is configured in the form of a plate, and the size of the first base portion 512 is identical to the size of the first augmentation portion 513.

The first reference portion 511, the first base portion 512, and the first augmentation portion 513 may be arranged parallel to one another or may be arranged not parallel to one another as shown in FIGS. 4 and 5.

The first base portion 512 and the first augmentation portion 513 corresponding to the first detection electrodes are identical to the first base portion 512 and the first augmentation portion 513 shown in FIGS. 4 and 5, as such a detailed description thereof will herein be omitted for convenience of description.

The first detection portion 510 may further include the first flow portion 551a through which oil flows to prevent oil formation.

The first flow portion 551a may be integrated with one surface of the first reference portion 511. The one surface of the first reference portion 511 may face the bottom surface of the compressor 1 from among a plurality of surfaces of the first reference portion 511 of the first detection portion 510 when the oil level sensor 500 is mounted to the compressor 1.

In addition, the first flow portion 551a may be formed in a right triangle shape. One surface of the first flow portion 551a may be formed to be tilted in the direction from one end to the other end of the first reference portion 511.

In more detail, a surface corresponding to the base line of the first flow portion 551a is adjacent to the bottom surface of the first reference portion 511, and a surface corresponding to the height of the first flow portion 551a may be adjacent to the separation member 516, and a surface corresponding to an oblique side of the first flow portion 551a is exposed to the outside.

That is, the first flow portion 551a may be extended downward (in the direction of gravity) from the bottom surface of the first reference portion 511.

As described above, the first flow portion 551a protrudes from the first reference portion 511 along a predetermined slope, such that oil flows downward along the first flow portion 551a, and oil formation onto the first detection portion 510 can be prevented.

In addition, the first base portion 512 and the first augmentation portion 513 are respectively arranged at both sides of the first reference portion 511, and capacitance generated in the first detection portion 510 may increase and precision of oil detection may also increase.

The second detection portion 520 may include a second reference portion 521 corresponding to a second reference electrode; and a second base portion 522 and a first augmentation portion 523 corresponding to second detection electrodes.

The second base portion 522 and the second augmentation portion 523 may be respectively arranged at both sides of the second reference portion 521 on the basis of the second reference portion interposed therebetween, and may be spaced apart from the second reference portion 521 by a predetermined distance.

The second base portion 522 and the second augmentation portion 523 may be symmetrical with each other on the basis of the second reference portion 521, and may have the same size. That is, horizontal and vertical lengths of the second base portion 522 are identical to those of the second augmentation portion 523, each of the second base portion 522 and the second augmentation portion 523 is configured in the form of a plate, and the size of the second base portion 522 is identical to the size of the second augmentation portion 523.

The second reference portion 521, the second base portion 522, and the second augmentation portion 523 may be arranged parallel to one another or may be arranged not parallel to one another as shown in FIGS. 4 and 5.

The second base portion 522 and the second augmentation portion 523 corresponding to the second detection electrodes are identical to the second base portion 522 and the second augmentation portion 523 shown in FIGS. 4 and 5, as such a detailed description thereof will herein be omitted for convenience of description.

The second detection portion 520 may further include the second flow portion 551b through which oil flows to prevent oil formation.

The second flow portion 551b may be integrated with one surface of the second reference portion 521. The one surface of the second reference portion 521 may face the bottom surface of the compressor 1 from among a plurality of surfaces of the second reference portion 521 of the second detection portion 520 when the oil level sensor 500 is mounted to the compressor 1.

In addition, the second flow portion 551b may be formed in a right triangle shape. One surface of the second flow portion 551b may be formed to be tilted in the direction from one end to the other end of the second reference portion 521.

In more detail, a surface corresponding to the base line of the second flow portion 551b is adjacent to the bottom surface of the second reference portion 521, and a surface corresponding to the height of the second flow portion 551b and a surface corresponding to an oblique side of the second flow portion 551b are exposed to the outside.

That is, the second flow portion 551b may be extended downward (in the direction of gravity) from the bottom surface of the second reference portion 521.

The first flow portion 551a and the second flow portion 551b may have the same shapes and sizes. In addition, the first flow portion 551a may be smaller in size than the second flow portion 551b according to arrangement of the first reference portion 511, the second reference portion 521, and the separation member 516.

A detailed description thereof will hereinafter be given with reference to the attached drawings.

Since the separation member 516 contacts the bottom surface of the first reference portion 511, the length of the bottom surface of the first reference portion 511 is shorter than the length of the bottom surface of the second reference portion 521 by a contact length (L).

The first flow portion 551a may be arranged at the bottom surface of the first reference portion 511, and the second flow portion 551b may be arranged at the bottom surface of the second reference portion 521. Since the length of the first reference portion 511 is shorter than the length of the second reference portion 521 by a contact length (L), the base line of the first flow portion 551a is shorter than the base line of the second flow portion 551b by the contact length (L).

In addition, the height of the first flow portion 551a and the height of the second flow portion 551b may be identical to or different from each other.

As described above, the second flow portion 551b protrudes from the second reference portion 521 along a predetermined slope, such that oil flows downward along the second flow portion 551b, and oil formation onto the second detection portion 520 can be prevented.

The second base portion 522 and the second augmentation portion 523 are respectively arranged at both sides of the second reference portion 521, such that capacitance generated in the second detection portion 520 may increase and precision of oil detection may also increase.

Figure 7:
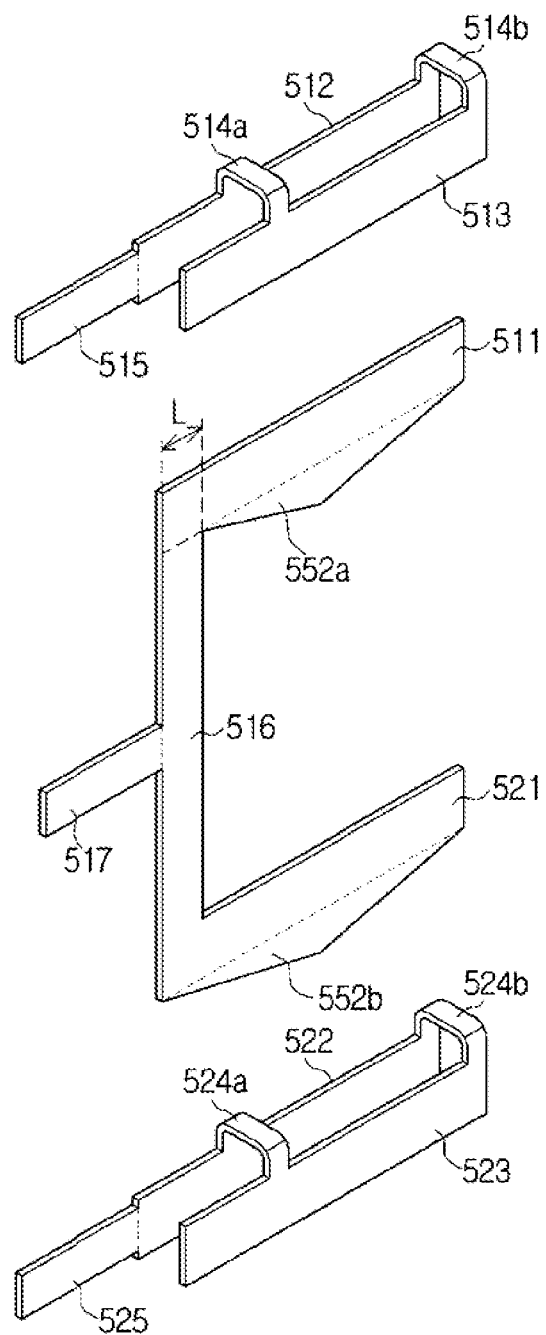
FIG. 7 is an exploded perspective view illustrating an oil level sensor according to another embodiment of the present disclosure.

FIG. 7 is an exploded perspective view illustrating an oil level sensor according to another embodiment of the present disclosure.

In FIG. 7, the same reference numbers and names as those of FIG. 4 will be used to refer to the same or like parts wherever possible, and thus a detailed description thereof will be omitted.

Referring to FIG. 7, the oil level sensor 500 may further include flow portions 550 (552a, 552b).

The first detection portion 510 may further include the third flow portion 552a through which oil flows to prevent oil formation.

The third flow portion 552a may be integrated with one surface of the first reference portion 511. The one surface of the first reference portion 511 may face toward the bottom surface of the compressor 1 from among a plurality of surfaces of the first reference portion 511 of the first detection portion 510 when the oil level sensor 500 is mounted to the compressor 1.

In addition, the third flow portion 552a may be formed in an isosceles triangle plate shape. The third flow portion 552a may be formed to be tilted in the direction from both sides to the center portion of the first reference portion 511.

In more detail, the surface corresponding to the base line of the third flow portion 552a is adjacent to the bottom surface of the first reference portion 511, and a vertex of the third flow portion 552a is spaced from the first reference portion 511 by a predetermined distance.

That is, the vertex of the third flow portion 552a is spaced from the center point of the exposed bottom surface of the first reference portion 511 by a predetermined distance.

In addition, the vertex of the third flow portion 552a may be spaced apart from a certain point from among the exposed bottom surface of the first reference portion 511 by a predetermined distance. That is, the third flow portion 552a may be formed in a scalene triangle plate shape.

That is, the third flow portion 552a may be extended downward (in the direction of gravity) from the bottom surface of the first reference portion 511.

As described above, the third flow portion 552a protrudes from the first reference portion 511 along a predetermined slope, such that oil flows downward along the third flow portion 552a, and oil formation onto the first detection portion 510 can be prevented.

The second detection portion 520 may further include a fourth flow portion 552b through which oil flows to prevent oil formation.

The fourth flow portion 552b may be integrated with one surface of the second reference portion 521. The one surface of the second reference portion 521 may face the bottom surface of the compressor 1 from among a plurality of surfaces of the second reference portion 521 of the second detection portion 520 when the oil level sensor 500 is mounted to the compressor 1.

In addition, the fourth flow portion 552b may be formed in an isosceles triangle plate shape. The fourth flow portion 552b may be formed to be tilted in the direction from both sides to the center portion of the second reference portion 521.

In more detail, the surface corresponding to the base line of the fourth flow portion 552b is adjacent to the bottom surface of the second reference portion 512, and a vertex of the fourth flow portion 552b is spaced from the second reference portion 521 by a predetermined distance.

That is, the vertex of the fourth flow portion 552b is spaced from the center point of the exposed bottom surface of the second reference portion 521 by a predetermined distance.

In addition, the vertex of the fourth flow portion 552b may be spaced from a certain point from among the exposed bottom surface of the second reference portion 521 by a predetermined distance. That is, the fourth flow portion 552b may be formed in a scalene triangle plate shape.

That is, the fourth flow portion 552b may be extended downward (in the direction of gravity) from the bottom surface of the second reference portion 521.

The third flow portion 552a and the fourth flow portion 552b may have the same shapes and sizes. In addition, the third flow portion 552a may be smaller in size than the fourth flow portion 552b according to arrangement of the first reference portion 511, the second reference portion 521, and the separation member 516.

A detailed description thereof will hereinafter be given with reference to the attached drawings.

Since the separation member 516 contacts the bottom surface of the first reference portion 511, the length of the bottom surface of the first reference portion 511 is shorter than the length of the bottom surface of the second reference portion 521 by the contact length (L).

The third flow portion 552a is arranged at the bottom surface of the first reference portion 511, and the fourth flow portion 552b is arranged at the bottom surface of the second reference portion 521. Since the length of the first reference portion 511 is shorter than the length of the second reference portion 521 by the contact length (L), the length of the base line of the third flow portion 552a is shorter than the length of the base line of the fourth flow portion 552b by the contact length (L).

In addition, the height of the third flow portion 552a may be identical to or different from the height of the fourth flow portion 552b.

As described above, the fourth flow portion 552b protrudes from the second reference portion 521 along a predetermined slope, such that oil flows downward along the fourth flow portion 552b, and oil formation onto the second detection portion 510 can be prevented and the oil leakage time can be reduced.

Figure 8:
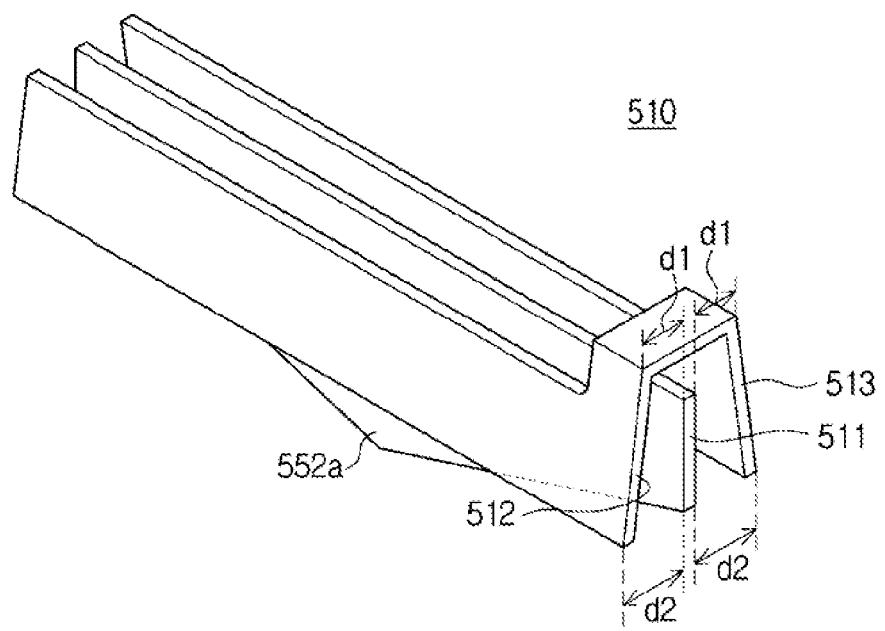
FIG. 8 is a perspective view illustrating an oil level sensor according to another embodiment of the present disclosure.

FIG. 8 is a perspective view illustrating an oil level sensor according to another embodiment of the present disclosure. Only the first detection portion 510 different in structure from the oil level sensor 50 shown in FIG. 7 will hereinafter be described in detail.

The first detection portion 510 may include a first reference portion 511 corresponding to a reference electrode; and a first base portion 512 and a first augmentation portion 513 corresponding to detection electrodes.

The first base portion 512 and the first augmentation portion 513 may be respectively arranged at both sides of the first reference portion 511 on the basis of the first reference portion interposed therebetween.

The first base portion 512 and the first augmentation portion 513 may have the same size. That is, horizontal and vertical lengths of the first base portion 512 are identical to those of the first augmentation portion 513, each of the first base portion 512 and the first augmentation portion 513 is configured in the form of a plate, and the size of the first base portion 512 is identical to the size of the first augmentation portion 513. In addition, the first reference portion 511 may also be configured in the form of a plate, and may be identical in size to the first base portion 512.

The first base portion 512 and the first augmentation portion 513 may be symmetrical with each other on the basis of the first reference portion 511, and the first base portion 512 and the first augmentation portion 513 are not arranged parallel to each other.

In more detail, a first distance (d1) between one end of the first reference portion 511 and one end of the first base portion 512 adjacent to one end of the first reference portion 511 may be different from a second distance (d2) between the other end of the first reference portion 511 and the other end of the first base portion 513 adjacent to the first reference portion 511. That is, the first distance (d1) is shorter than the second distance (d2).

In addition, the first distance (d1) between one end of the first reference portion 511 and the first augmentation portion 513 adjacent to one end of the first reference portion 511 may be different from the second distance (d2) between the other end of the first reference portion 511 and the other end of the first augmentation portion 513 adjacent to the first reference portion 511. That is, the first distance (d1) is shorter than the second distance (d2).

That is, as the distance from one side to the other side of the first reference portion 511 gradually increases on the basis of the first reference portion 511, the distance from the first reference portion 511 to the first base portion 512 gradually increases. In addition, as the distance from one side to the other side of the first reference portion 511 on the basis of the first reference portion 511, the distance from the first reference portion 511 to the first augmentation portion 513 gradually increases.

As described above, a cross section of the first detection portion 510 is formed in a trapezoidal shape, and the first base portion 512 has a constant slope on the basis of the first reference portion 511. In addition, the first augmentation portion 513 may have a constant slope on the basis of the first reference portion 511.

The first detection portion 510 may further include the third flow portion 552a through which oil flows to prevent oil formation. The third flow portion 552a may be integrated with one surface of the first reference portion 511. The one surface of the first reference portion 511 may face the bottom surface of the compressor 1 from among a plurality of surfaces of the first reference portion 511 of the first detection portion 510 when the oil level sensor 500 is mounted to the compressor 1.

In addition, the third flow portion 552a may be formed in an isosceles triangle shape. One surface of the third flow portion 552a may be formed to be tilted in the direction from both sides to the center part of the first reference portion 511.

In more detail, a surface corresponding to the base line of the third flow portion 552a is adjacent to the bottom surface of the first reference portion 511, and a vertex of the third flow portion 552a is spaced from the first reference portion 511 by a predetermined distance.

That is, the vertex of the third flow portion 552a is spaced from the center point of the exposed bottom surface of the first reference portion 511 by a predetermined distance.

In addition, the vertex of the third flow portion 552a may be spaced apart from a certain point from among the exposed bottom surface of the first reference portion 511 by a predetermined distance. That is, the third flow portion 552a may be formed in a scalene triangle plate shape.

That is, the third flow portion 552a may be extended downward (in the direction of gravity) from the bottom surface of the first reference portion 511.

As described above, the first base portion 512 and the first augmentation portion 513 are respectively disposed at both sides of the first reference portion 511, such that capacitance generated in the first detection portion 510 may increase and precision of oil detection may also increase.

In addition, the first base portion 512 and the first augmentation portion 513 may have a predetermined slope on the basis of the first reference portion 511, such that oil formation among the first reference portion 511, the first base portion 512, and the first augmentation portion 511 is prevented.

The second detection portion not shown in FIG. 8 may be identical in structure to the first detection portion 510.

Figure 9:
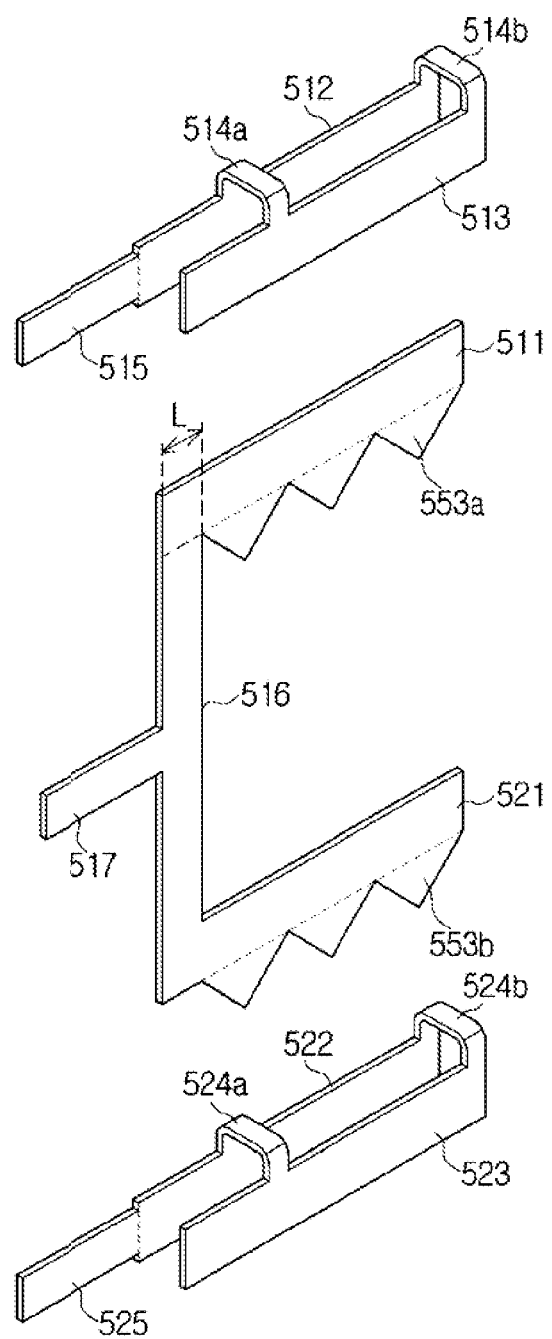
FIG. 9 is an exploded perspective view illustrating an oil level sensor according to another embodiment of the present disclosure.
Figure 10:
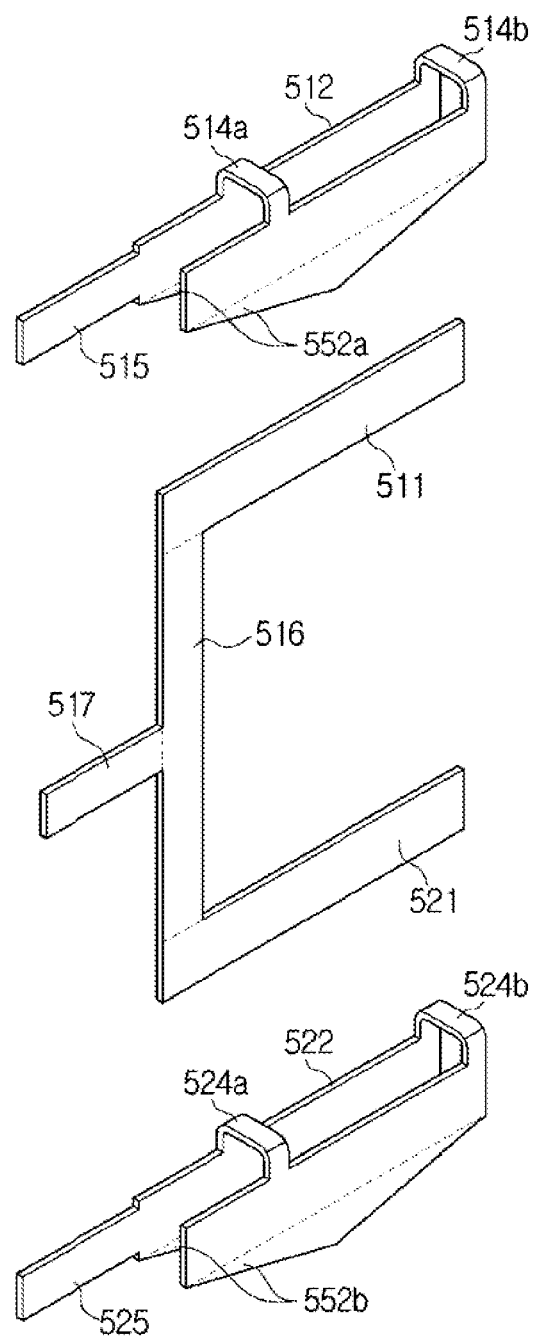
FIG. 10 is an exploded perspective view illustrating an oil level sensor according to another embodiment of the present disclosure.

FIG. 9 is an exploded perspective view illustrating an oil level sensor according to another embodiment of the present disclosure. FIG. 10 is an exploded perspective view illustrating an oil level sensor according to another embodiment of the present disclosure. In FIGS. 9 and 10, the same reference numbers and names as those of FIG. 4 will be used to refer to the same or like parts wherever possible, and thus a detailed description thereof will be omitted.

In FIG. 9, the oil level sensor 500 may further include flow portions 550 (553a, 553b).

The first detection portion 510 may further include the fifth flow portion 553a through which oil flows to prevent oil formation.

The fifth flow portion 553a may be integrated with one surface of the first reference portion 511. The one surface of the first reference portion 511 may face the bottom surface of the compressor 1 from among a plurality of surfaces of the first reference portion 511 of the first detection portion 510 when the oil level sensor 500 is mounted to the compressor 1.

In addition, the fifth flow portion 553a may be formed in a serrated plate shape in which plural triangular plates are successively or linearly arranged. The triangular plates may be identical to or different from each other.

That is, the fifth flow portion 553a may be irregularly extended downward (in the direction of gravity) from the bottom surface of the first reference portion 511.

As described above, the fifth flow portion 553a protrudes from the first reference portion 511 along a predetermined slope, such that oil flows downward along the fifth flow portion 553a, and oil formation onto the first detection portion 510 can be prevented.

The second detection portion 520 may further include a sixth flow portion 553b through which oil flows to prevent oil formation.

The sixth flow portion 553b may be integrated with one surface of the second reference portion 521. The one surface of the second reference portion 521 may face toward the bottom surface of the compressor 1 from among a plurality of surfaces of the second reference portion 521 of the second detection portion 520 when the oil level sensor 500 is mounted to the compressor 1.

In addition, the sixth flow portion 553b may be formed in a serrated plate shape in which plural triangular plates are successively arranged. The triangular plates may be identical to or different from each other.

That is, the sixth flow portion 553b may be irregularly extended downward (in the direction of gravity) from the bottom surface of the second reference portion 521.

The fifth flow portion 553a and the sixth flow portion 553b may have the same shape and the same size. In addition, according to the arrangement structure of the first reference portion 511, the second reference portion 521, and the separation member 516, each serration shape of the fifth flow portion 553a may be smaller in size than each serration shape of the sixth flow portion 553b, and the number of serration shapes of the fifth flow portion 553a may be less than the number of serration shapes of the sixth flow portion 553b. A detailed description thereof will hereinafter be given in detail.

Since the separation member 516 contacts the bottom surface of the first reference portion 511, the length of the bottom surface of the first reference portion 511 is shorter than the length of the bottom surface of the second reference portion 521 by the contact length (L).

The fifth flow portion 553a is arranged at the bottom surface of the first reference portion 511, and the sixth flow portion 553b is arranged at the bottom surface of the second reference portion 521. Since the length of the first reference portion 511 is shorter than the length of the second reference portion 521 by the contact length (L), each serration disposed at the bottom surface of the first reference portion 511 may be smaller in size than each serration disposed at the bottom surface of the second reference portion 521.

In addition, assuming that each serration of the fifth flow portion 553a is identical in size to each serration of the sixth flow portion 553b, the number of serration shapes of the fifth flow portion 553a may be less than the number of serration shapes of the sixth flow portion 553b.

As described above, a non-parallel structure and a serrated structure are used between electrodes, such that oil formation onto the first detection portion 510 and the second detection portion 520 can be maximally prevented.

Meanwhile, although FIGS. 6 to 10 have exemplarily disclosed that the flow portions 550 {i.e., (551a, 551b), (552a, 552b), (553a, 553b)} are provided in the first and second reference portions (511, 521) for convenience of description and better understanding of the present disclosure, the scope or spirit of the present disclosure is not limited thereto, the flow portions 550 may also be provided in any one of the first and second reference portions (511, 521) without departing from the scope or spirit of the present disclosure.

In addition, as can be seen from FIG. 10, the flow portions 550 may also be provided in at least one of the first base portion 512, the first augmentation portion 513, the second base portion 522, and the second augmentation portion 523 without departing from the scope or spirit of the present disclosure.

Figure 11:
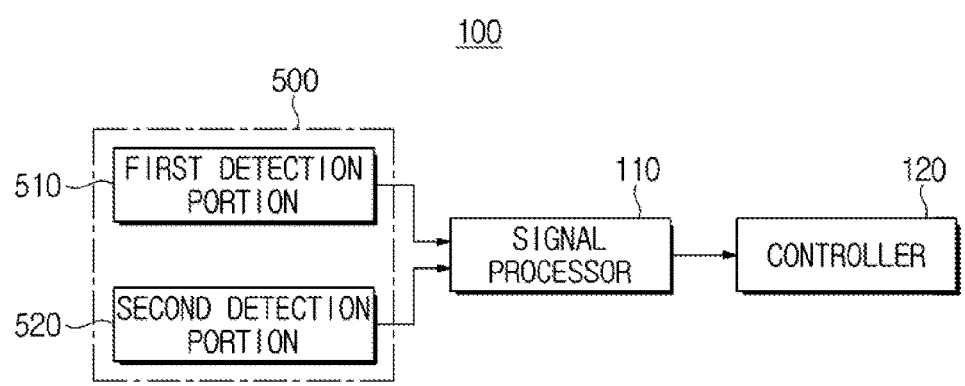
FIG. 11 is a block diagram illustrating an oil level detection apparatus according to an embodiment of the present disclosure.

FIG. 11 is a block diagram illustrating the oil level detection apparatus according to an embodiment of the present disclosure.

Referring to FIG. 11, the oil level detection apparatus 100 may include an oil level sensor 500, a signal processor 110, and a controller 120.

The oil level sensor 500 may measure capacitance of each electrode according to the level of oil contained in the compressor 1, and detect the oil level on the basis of the measured capacitance. The oil level sensor 500 may include a first detection portion 510 and a second detection portion 520 such that an electrode capacitance value of the first detection portion 510 or the second detection portion 520 is changed according to whether the first detection portion 510 or the second detection portion 520 contacts the oil stored in the oil storage portion 50.

The first detection portion 510 and the second detection portion 520 are used as the measurement electrodes configured to detect the oil level at two parts (i.e., an upper part and a lower part) of the oil storage portion 50, such that the first detection portion 510 and the second detection portion 520 can detect the oil level on the basis of capacitance changed according to whether each electrode contacts the oil.

The oil level sensor 500 may output an input signal received from the first connection terminal 541 to the reference terminal 517 through a power-supply unit (not shown). In this case, the reference terminal 517 may output the received input signal to reference electrodes corresponding to the first and second reference portions (511, 521).

Upon receiving the input signal, the first and second detection portions (510, 520) of the oil level sensor 500 may perform the charging/discharging operations.

That is, if a voltage of each of the reference electrode and the detection electrode reaches a maximum charging voltage, the first and second detection portions (510, 520) finish charging between the two electrodes. If the discharging operation starts, a voltage between the two electrodes is gradually reduced. Thereafter, if the voltage between the two electrodes reaches a minimum discharge voltage, the first and second detection portions (510, 520) finish discharging, and then perform recharging.

The charging/discharging operations of the first and second detection portions (510, 520) may be determined according to a voltage corresponding to capacitance generated between the reference electrode and the detection electrode. This capacitance may be changed according to a dielectric constant (permittivity) between the reference electrode and the detection electrode, and a detailed description thereof will hereinafter be given.

The first detection portion 510 may output a first detection signal corresponding to capacitance generated between the first base portion 512 and the first augmentation portion 513 corresponding to detection electrodes to the first coupling terminal 515. The first coupling terminal 515 may output the first detection signal to the signal processor 110 through the second connection terminal 542.

The second detection portion 520 may output a second detection signal corresponding to capacitance generated between the second base portion 522 and the second augmentation portion 523 to the second coupling terminal 525. The second coupling terminal 512 may output the second detection signal to the signal processor 110 through the third connection terminal 543.

As described above, a dielectric constant of the first detection portion 510 or the second detection portion 520 may be changed according to whether the first detection portion 510 or the second detection portion 520 contacts the oil stored in the compressor 1, and capacitance generated between the first detection portion 510 and the second detection portion 520 may be changed according to variation of the dielectric constant (permittivity).

The first detection portion 510 and the second detection portion 520 may respectively output voltage signals corresponding to capacitance changed according to the dielectric constant (permittivity) as detection signals.

Each of the detection signals is a voltage signal combined with a voltage corresponding to capacitance generated in each of the first detection portion 510 and the second detection portion 520. The electric signal may include a pulse-shaped frequency or a digital signal.

That is, information as to whether the first detection portion 510 and the second detection portion 520 contact the oil can be determined or recognized according to voltage signals generated from the first and second detection portions (510, 520).

In addition, information as to whether the first detection portion 510 and the second detection portion 520 contact the oil can be recognized through a trigger frequency based on the voltage signals detected by the first and second detection portions (510, 520), and a detailed description thereof will hereinafter be given.

The dielectric constant (permittivity) of air is about 1, and the dielectric constant (permittivity) of oil is about 3. If the first and second detection portions (510, 520) contact the oil, the dielectric constant between the reference portions (511, 521) and the base portions (512, 522) and the dielectric constant between the reference portions (511, 521) and the augmentation portions (513, 523) are increased, resulting in increased capacitance. A voltage value is gradually reduced in response to the increasing capacitance, such that the charging time and the discharging time of the first and second detection portions (510, 520) may increase.

In contrast, if the first and second detection portions (510, 520) are exposed to the air, the dielectric constant between the reference portions (511, 521) and the base portions (512, 522) and the dielectric constant between the reference portions (511, 521) and the augmentation portions (513, 523) may be reduced, resulting in a reduction of capacitance. A voltage value is gradually increased in response to the reducing capacitance, such that the charging time and the discharging time of the first and second detection portions (510, 520) may be reduced.

That is, a voltage indicating a detection signal corresponding to capacitance generated in the first or second detection portion (510, 520) may increase or decrease according to the charging and discharging operations of the first or second detection portion (510, 520), and the charging and discharging times may be changed according to whether the first or second detection portion (510, 520) contacts the oil.

The trigger frequency can be measured on the basis of the charging and discharging times.

The signal processor 110 may convert a voltage signal corresponding to capacitance generated from each of the first and second detection portions (510, 520) of the oil level sensor 500 into a trigger frequency signal. The trigger frequency is gradually increased in response to reduction in the charging/discharging times. That is, the trigger frequency is inversely proportional to capacitance.

That is, the signal processor 110 may convert a voltage signal corresponding to capacitance detected by the first detection portion 510 into a first trigger frequency signal, and may convert a voltage signal corresponding to capacitance detected by the second detection portion 520 into a second trigger frequency signal.

In addition, the signal processor 110 may also convert the voltage signal or the pulse signal of each of the first and second detection portions (510, 520) into a digital signal.

The controller 120 may determine the level of oil stored in the compressor 1 on the basis of the trigger frequency signal converted by the signal processor 110.

In addition, the controller 120 may store reference values for determining the level of oil stored in the compressor 1. In this case, the reference values may be established to determine whether the amount of oil contacting the oil level sensor 500 is considered appropriate, excessive, or insufficient, and may use the trigger frequency value.

In addition, the controller 120 may store reference values for determining a state of the oil stored in the compressor 1. In this case, the reference values may be established to determine whether the state of oil contacting the oil level sensor 500 is a liquid refrigerant, a bubble refrigerant, or a gaseous refrigerant, and may use the trigger frequency value.

In more detail, if the amount of the oil stored in the compressor 1 is at an appropriate level, this means that the oil level is disposed between the first detection portion 510 located above the oil level sensor 500 and the second detection portion 520 located below the oil level sensor 500. Therefore, the controller 120 may determine the trigger frequency (about 48.95) acting as a reference value for determining that the oil level is disposed between the first detection portion 510 and the second detection portion 520 to be a first reference value Ref1 (about 48.95).

If the amount of the oil stored in the compressor 1 is at an excessive level, this means that the oil level is higher than the position of the first detection portion 510 located above the oil level sensor 500. Therefore, the controller 120 may determine the trigger frequency (about 37.7) acting as a reference value for determining that the oil level is higher than the position of the first detection portion 510 to be a second reference value Ref2.

In addition, if the amount of the oil stored in the compressor 1 is at an insufficient level, this means that the oil level is lower than the position of the second detection portion 510 located below the oil level sensor 500.

As described above, the controller 120 may detect the level of oil stored in the compressor 1 using the first reference value (Ref1) and the second reference value (Ref2). A method for detecting the oil level will hereinafter be described with reference to FIGS. 12 to 15.

Figure 12:
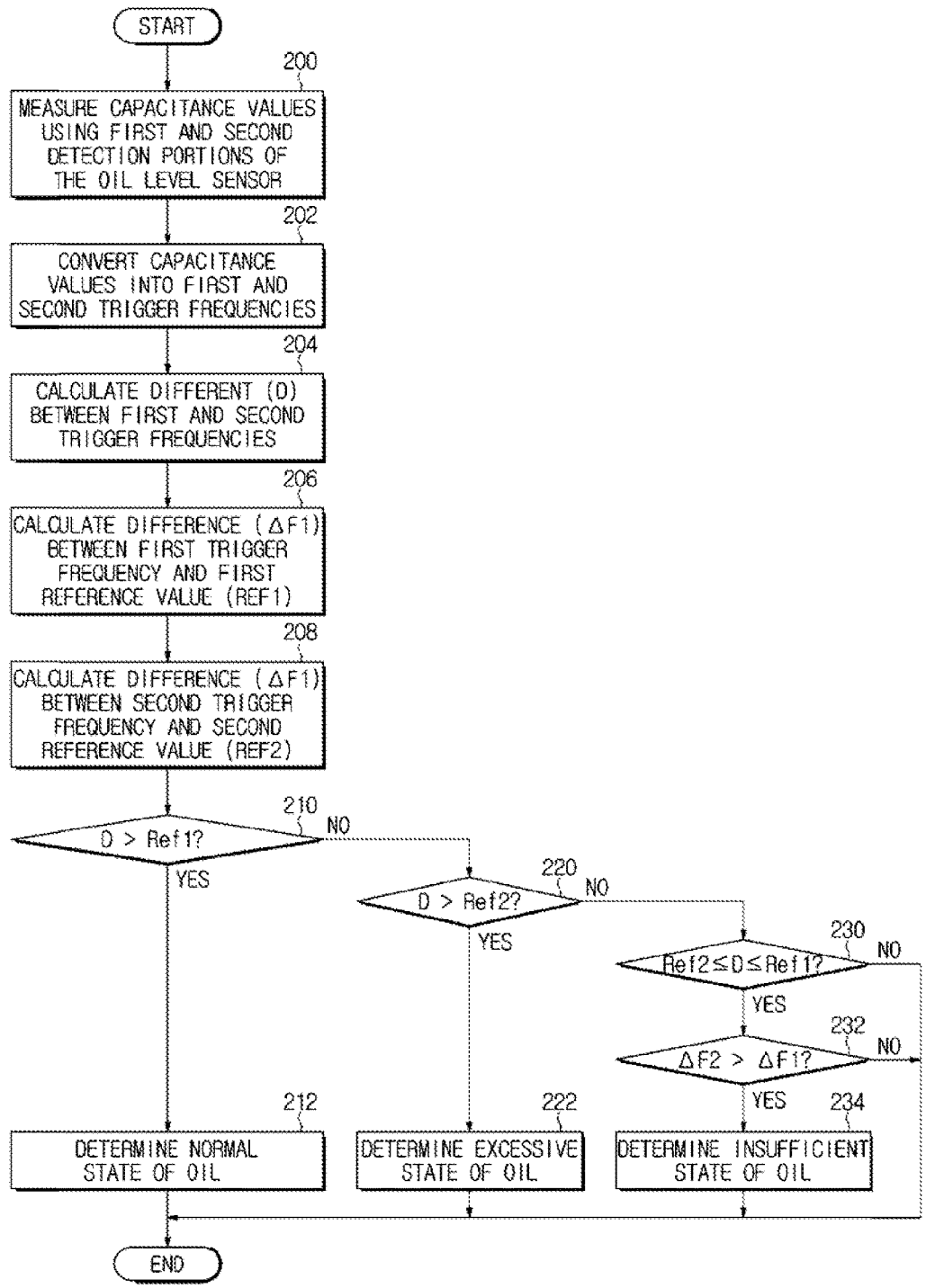
FIG. 12 is a flowchart illustrating a method for controlling oil level detection according to an embodiment of the present disclosure.
Figure 13:
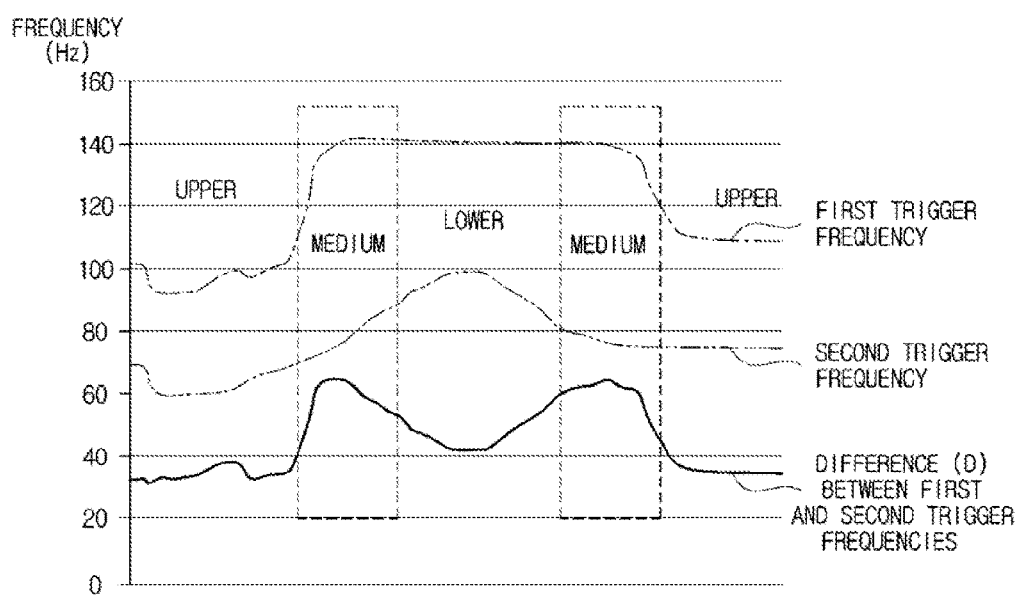
FIG. 13 is a graph illustrating a trigger frequency changing with the oil level for use in the oil level detection apparatus according to an embodiment of the present disclosure.
Figure 14:
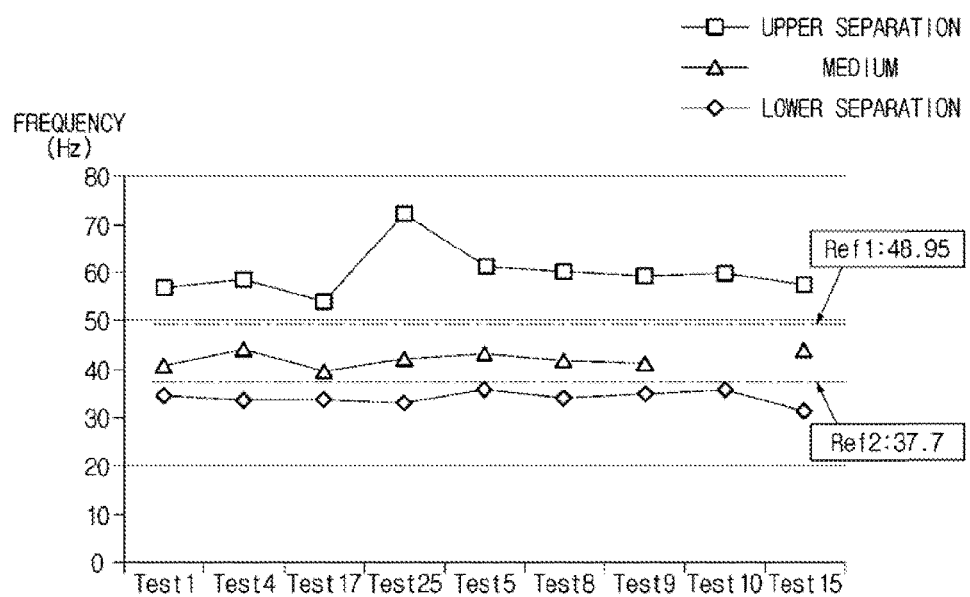
FIG. 14 is a graph illustrating a frequency difference between upper and lower electrodes changing with the oil level for use in the oil level detection apparatus according to an embodiment of the present disclosure.
Figure 15:
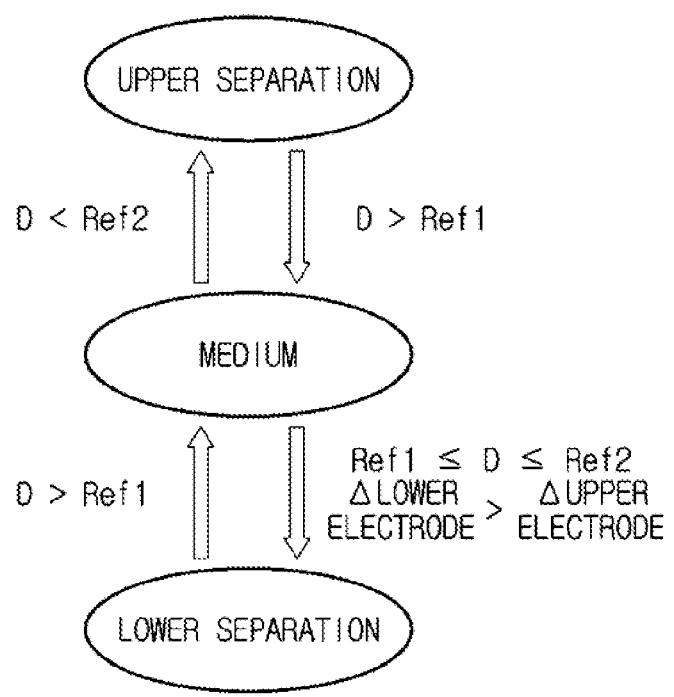
FIG. 15 is a conceptual diagram illustrating a method for determining the oil level by comparing a frequency difference between upper and lower electrodes with a reference value in the oil level detection apparatus according to an embodiment of the present disclosure.

FIG. 12 is a flowchart illustrating a method for controlling oil level detection according to an embodiment of the present disclosure. FIG. 13 is a graph illustrating a trigger frequency changing with the oil level for use in the oil level detection apparatus according to an embodiment of the present disclosure. FIG. 14 is a graph illustrating a frequency difference between upper and lower electrodes changing with the oil level for use in the oil level detection apparatus according to an embodiment of the present disclosure. FIG. 15 is a conceptual diagram illustrating a method for determining the oil level by comparing a frequency difference between upper and lower electrodes with a reference value in the oil level detection apparatus according to an embodiment of the present disclosure.

In FIG. 12, the oil level sensor 500 includes the first detection portion 510 located above the oil level sensor 500 and the second detection portion 520 located below the oil level sensor 500 so as to measure the level of oil stored in the compressor 1. The first detection portion 510 and the second detection portion 520 may respectively measure capacitance values at the upper and lower positions of the oil storage portion 50 in operation 200.

If capacitance values of respective electrodes of the first and second detection portions (510, 520) are measured, the signal processor 110 may convert voltage signals corresponding to the measured capacitance values of the respective electrodes into first and second trigger frequencies, and may output the first and second trigger frequencies to the controller 120 in operation 202.

The first and second trigger frequencies may be changed according to the oil levels (Upper/Medium/Lower) as shown in FIG. 13.

Therefore, the controller 120 may receive the first and second trigger frequencies converted by the signal processor 110, and calculate a difference (D) between the first trigger frequency and the second trigger frequency in operation 204.

A difference (D) between the first trigger frequency and the second trigger frequency may be changed according to the oil levels (Upper/Medium/Lower) as shown in FIG. 13.

The controller 120 may calculate a difference (ΔF1) between a current value (i.e., a first trigger frequency) of a trigger frequency corresponding to capacitance detected by the first detection portion 510 located above the oil level sensor 500 and a first reference value (Ref1), and may determine the calculated result to be the Δ-upper electrode in operation 206. The Δ-upper electrode is an absolute value obtained when the first trigger frequency is subtracted from the first reference value (Ref1).

In addition, the controller 120 may calculate a difference (ΔF2) between a current value (i.e., a second trigger frequency) of a trigger frequency corresponding to capacitance detected by the second detection portion 520 located below the oil level sensor 500 and a second reference value (Ref2), and may determine the calculated result to be the a-lower electrode in operation 208. The a-lower electrode is an absolute value obtained when the second reference value is subtracted from the second trigger frequency (Ref2).

Subsequently, the controller 120 may determine whether the difference (D) (shown in operation 204) between the first trigger frequency and the second trigger frequency is higher than the first reference value (Ref1) in operation 210.

In operation 210, if the difference (D) between the first trigger frequency and the second trigger frequency is higher than the first reference value (Ref1), the controller 120 may determine that the level of oil stored in the compressor 1 is in a normal range between the first detection portion 510 and the second detection portion 520 (see "Medium" shown in FIGS. 14 and 15), and may determine that the amount of oil stored in the compressor 1 is at an appropriate level in operation 212.

As can be seen from FIG. 14, if the level of oil stored in the compressor 1 is at the medium level disposed between the first detection portion 510 and the second detection portion 520, the difference (D) between the first trigger frequency and the second trigger frequency is higher than the first reference value (Ref1).

Meanwhile, if the difference (D) between the first trigger frequency and the second trigger frequency is not higher than the first reference value (Ref1) in operation 210, the controller 120 may determine whether the difference (D) between the first trigger frequency and the second trigger frequency is less than the second reference value (Ref2) in operation 220.

If the difference (D) between the first trigger frequency and the second trigger frequency is less than the second reference value (Ref2) in operation 220, the controller 120 may determine that the level of oil stored in the compressor 1 is higher than the position of the first detection portion 510 (see "upper separation" of FIGS. 14 and 15), and may determine that the amount of oil stored in the compressor 1 is an excessive level in operation 222.

As can be seen from FIG. 14, if the level of oil stored in the compressor 1 is at the upper-separation level that is higher than the position of the first detection portion 510, this means that the difference (D) between the first trigger frequency and the second trigger frequency is less than the second reference value (Ref2).

Meanwhile, if the difference (D) between the first trigger frequency and the second trigger frequency is not less than the second reference value (Ref2) in operation 220, the controller 120 may determine that the difference (D) between the first trigger frequency and the second trigger frequency is disposed between the first reference value (Ref1) and the second reference value (Ref2) in operation 230.

If the difference (D) between the first trigger frequency and the second trigger frequency is between the first reference value (Ref1) and the second reference value (Ref2) in operation 230, the controller 120 may determine whether the Δ-lower electrode (ΔF2) is larger in size than the Δ-upper electrode (ΔF1) in operation 232.

If the Δ-lower electrode (ΔF2) is larger in size than the Δ-upper electrode (ΔF1) in operation 232, the controller 120 may determine that the level of oil stored in the compressor 1 is less than the position of the second detection portion 520 (see "lower-separation" shown in FIGS. 14 and 15), and may determine that the amount of oil stored in the compressor 1 is at an insufficient level in operation 234.

As can be seen from FIG. 14, if the level of oil stored in the compressor 1 is at the lower-separation level lower than the position of the second detection portion 520, this means that the difference (D) between the first trigger frequency and the second trigger frequency is between the first reference value (Ref1) and the second reference value (Ref2).

As described above, the controller 120 may correctly detect the level of oil stored in the compressor 1 using capacitance values detected by the first and second detection portions (510, 520) and a reference value. That is, the frequency comparison scheme using two electrodes can correctly detect the level of oil stored in the compressor 1, a refrigerant state, and the level of mixed oil.

On the other hand, if the level of oil stored in the compressor 1 is lower than the position of the second detection portion 520 such that the amount of oil stored in the compressor 1 is considered insufficient, the controller 120 must perform the oil return control for returning oil to the inside of the compressor 1.

In order to perform the oil return control, it is necessary for the oil return system to be operated normally. Information as to whether the oil return system is operated normally can be recognized by detecting whether the oil flowing into the oil return pipe disposed between the accumulator and the compressor 1 can flow smoothly.

A detailed description thereof will hereinafter be given.

The oil stored in the compressor 1 may play an important role related to reliability of the compressor 1, for example, friction reduction of the compressor assembly 30, the cooling effect of the electric assembly 20, leakage reduction, etc. Although the oil must be used to prevent abrasion caused by mechanical friction during the compression process, some oil may leak out when the compressor 1 outputs the compressed gaseous refrigerant. The oil leaked from the compressor 1 passes through a heat exchanger along with refrigerant, and then returns to the compressor 1.

However, if a connection pipe for interconnecting an indoor unit and an outdoor unit in an air-conditioning system (e.g., a large-scale air-conditioner or a multi-air conditioning system) having the compressor 1 increases in length, a time consumed to return the oil increases, such that there is a high possibility of causing the oil insufficiency due to the increased time. Prior to generation of such a problem, the oil separator configured to return the leaked oil to the compressor 1 is used.

The oil separator separates oil from the mixture composed of refrigerant and oil leaked from the compressor 1, and returns the oil to the compressor 1. However, it is impossible for the oil separator to separate all oil from the mixture. Therefore, some oil leaked from the compressor 1 passes through the oil separator, passes through the heat exchanger or the like, and returns to the compressor 1. Before the mixture of the refrigerant and oil flows in the compressor 1, the mixture passes through the accumulator.

The accumulator separates only gas, and outputs the separated gas to the compressor 1, such that the oil is accumulated in the accumulator. If the oil is accumulated into the accumulator, the amount of oil stored in the compressor 1 is considered insufficient, such that an additional flow passage (i.e., an oil return line) from the accumulator to the compressor 1 may be constructed to prevent oil from accumulating in the accumulator. A valve for controlling the supply of oil and a filter for preventing a foreign material from being applied to the compressor 1 are installed in the flow passage.

The oil moves due to a differential pressure generated between the accumulator and the suction portion of the compressor 1. If flow blockage occurs by the foreign material due to a low differential pressure, there is a low possibility that oil is not returned. In this case, unexpected problems occur in the reliability of the compressor 1, such that there is a need to determine whether the flow of oil is normally achieved.

Although the method for visualizing the flow of oil can be used, flow speed is very slow and thus it is difficult to confirm the flow speed. In order to constantly check the flow speed of oil as well as to utilize the checked flow speed to detect malfunction, it is necessary for the flow speed to be output as a value capable of being utilized for control.

There may occur various output signals in response to an input signal indicating the presence or absence of the flow of oil. For example, mass (inertia, natural frequency), sound waves, temperature, heat transfer, resistance, dielectric constant (permittivity), permeability, etc. may be used as the various output signals.

The present disclosure proposes an oil flow detection apparatus. The oil flow detection apparatus applies a predetermined temperature to an external part of the pipe using a heat transfer characteristic variation caused by output characteristics, such that the oil flow detection apparatus can determine the presence or absence of the flow of oil contained in the pipe on the basis of the external temperature variation, and a detailed description thereof will hereinafter be given.

Figure 16:
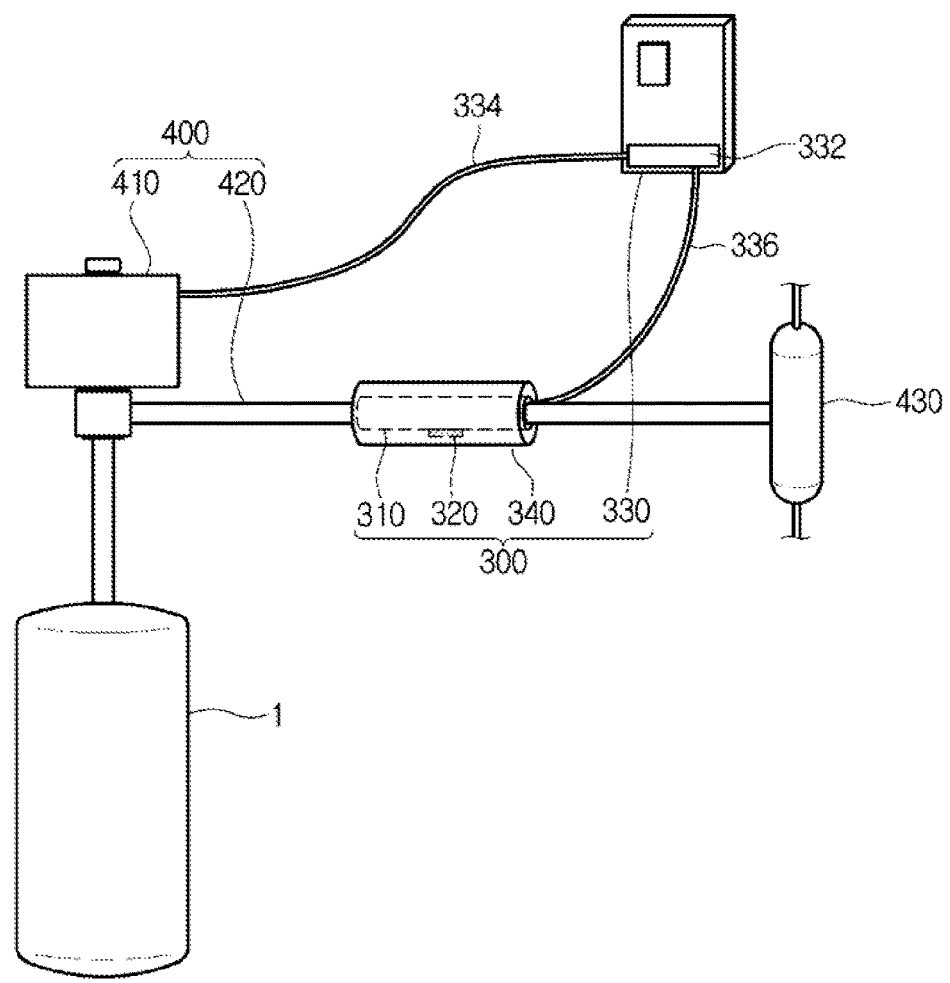
FIG. 16 is a schematic diagram illustrating the oil flow detection apparatus according to an embodiment of the present disclosure.

FIG. 16 is a schematic diagram illustrating the oil flow detection apparatus according to an embodiment of the present disclosure.

Prior to describing the oil flow detection apparatus 300, the oil return flow passage 400 in which the oil flow detection apparatus is installed will hereinafter be described in detail.

The oil return flow passage 400 may be used as a flow passage through which the oil is returned from the accumulator 430 to the compressor 1. The oil return flow passage 400 may include an oil supply valve 410 (hereinafter referred to as a valve) and an oil return pipe 420 (hereinafter referred to as a pipe), and the pipe 420 is connected to the accumulator 430 and the suction pipe of the compressor 1.

If there is a need to increase the level of oil stored in the compressor 1, the level of oil is increased by opening the valve 410. If there is a need to reduce the level of oil stored in the compressor 1, the valve 410 is closed.

The compressor 1 may compress gaseous refrigerant having a low-temperature-low-pressure gaseous state, and may discharge gaseous refrigerant having a high-temperature-high-pressure gaseous state.

The accumulator 430 is connected to the suction part of the compressor 1, isolates non-vaporized liquid refrigerant from among the refrigerant suctioned into the compressor 1, prevents liquid refrigerant from being applied to the compressor 1, and thus prevents damage to the compressor 1.

In addition, the accumulator 430 may vaporize liquid refrigerant from among the mixture of not only the refrigerant having passed through a freezing cycle but also the oil. In more detail, the refrigerant is discharged from the compressor 1, passes through the freezing cycle (e.g., the freezing cycle contained in the refrigerator or the air-conditioner) having the compressor 1, and returns to the accumulator 430.

The valve 410 is installed at one side of the pipe 420 connected to both the accumulator 430 and the compressor 1, and is opened or closed according to the level of oil stored in the compressor 1, such that the oil accumulated in the accumulator 430 is supplied to the compressor 1.

The oil moves by a differential pressure generated between the accumulator 430 and the suction side of the compressor 1. If blockage occurs by a foreign material due to a low differential pressure, there is a possibility that the oil may not be returned. As such, the oil flow detection apparatus according to the embodiment can determine whether the flow of oil is normally achieved.

The oil flow detection apparatus has the following characteristics. If no oil flows in the pipe 420 when heat is supplied to the external part of the pipe 420, heat radiation is not smoothly achieved such that the surface temperature of the pipe 420 unavoidably increases. However, if the oil flows in the pipe 420, the surface temperature of the pipe 420 is reduced. As a result, the oil flow detection apparatus can detect the flow of oil using the above-mentioned characteristics.

A detailed description of the oil flow detection apparatus will hereinafter be described in detail.

The oil flow detection apparatus 300 according to the embodiment may be installed in the pipe 420 disposed between the compressor 1 and the accumulator 430, and may include a heating unit 310, a temperature measurement unit 320, and a controller 330.

The heating unit 310 is a heater that is mounted to the outside of the pipe 420 connected to both the compressor 1 and the accumulator 430 so as to heat the pipe 420.

The temperature measurement unit 320 is a temperature sensor configured to measure the surface temperature of the pipe 420 heated by the heating unit 310. The temperature measurement unit 320 is configured to measure a difference between the surface temperature of the pipe 420 heated by the heating unit 310 and the temperature of oil stored in the pipe 420.

The controller 330 may monitor temperature variation of the pipe 420 measured by the temperature measurement unit 320, and may detect whether the flow of oil is normally achieved according to a temperature variation of the pipe 420. The flow of oil may be adjusted by turning the valve 410 on or off.

The presence or absence of the flow of oil may be decided according to a temperature variation of the pipe 420, and, as such, this decision reference is of importance. Therefore, any one of a first temperature variation and a second temperature variation may be selectively used as the decision reference. The first temperature variation is generated when the flow of oil is present or absent under the condition that heat is supplied to the pipe 420. The second temperature variation is generated when the flow of oil is present or absent under the condition that no heat is supplied to the pipe 420.

In addition, if the flow of oil is normally achieved according to a temperature variation of the pipe 420, the controller 330 turns the valve 410 off, and then monitors the increasing temperature of the pipe 420. If the valve 410 is turned off, the controller 330 detects the presence or absence of the flow of oil in response to the increasing temperature of the pipe 420, and determines whether the valve 410 is in a normal state.

In addition, if the flow of oil is not detected after the controller 330 controls the valve 410 for oil return, the oil level control for supplying the oil to the compressor 1 is performed a reference number of times (e.g., at least 3 times). Although the oil level control operation is repeated the reference number of times, if the oil level is at an insufficient level and the flow of oil is not detected, the controller 330 starts the oil return operation. A predetermined time of about 10 minutes is consumed to perform only one oil return operation, and a predetermined stabilization time is then consumed, such that a total of about 20 minutes is consumed for the overall oil return operation. Performance variation occurs during the oil return operation, resulting in greater user inconvenience. Prior to starting the oil return operation, the oil level control is repeated a reference number of times by controlling the valve 410 of the oil return flow passage 400, such that the level of oil stored in the compressor 1 can be adjusted.

In addition, the controller 330 may further include a power-supply unit 332 for supplying a power-supply voltage to the valve 410 and the heating unit 310. The power-supply unit 332 is connected to the power lines (334, 336) for supplying a power-supply voltage to the valve 410 and the heating unit 310.

In addition, the oil flow detection apparatus 300 according to the embodiment may further include an insulation material 340 configured to enclose the heating unit 310.

The insulation material 340 is configured to minimize the influence of external air current or the like when detecting the flow of oil flowing in the pipe 420. If the external influence is not high, the insulation material 340 may be omitted.

Meanwhile, although the controller 120 of the oil level detection apparatus 100 shown in FIG. 11 and the controller 330 of the oil level detection apparatus 300 shown in FIG. 11 are implemented as different controllers for convenience of description and better understanding of the present disclosure, it should be noted that the controller 120 of the oil level detection apparatus 100 and the controller 330 of the oil flow detection apparatus 300 can also be implemented as a single controller without departing from the scope or spirit of the present disclosure.

The operations and effects of the oil flow detection control method according to the embodiment will hereinafter be described in detail.

Figure 17:
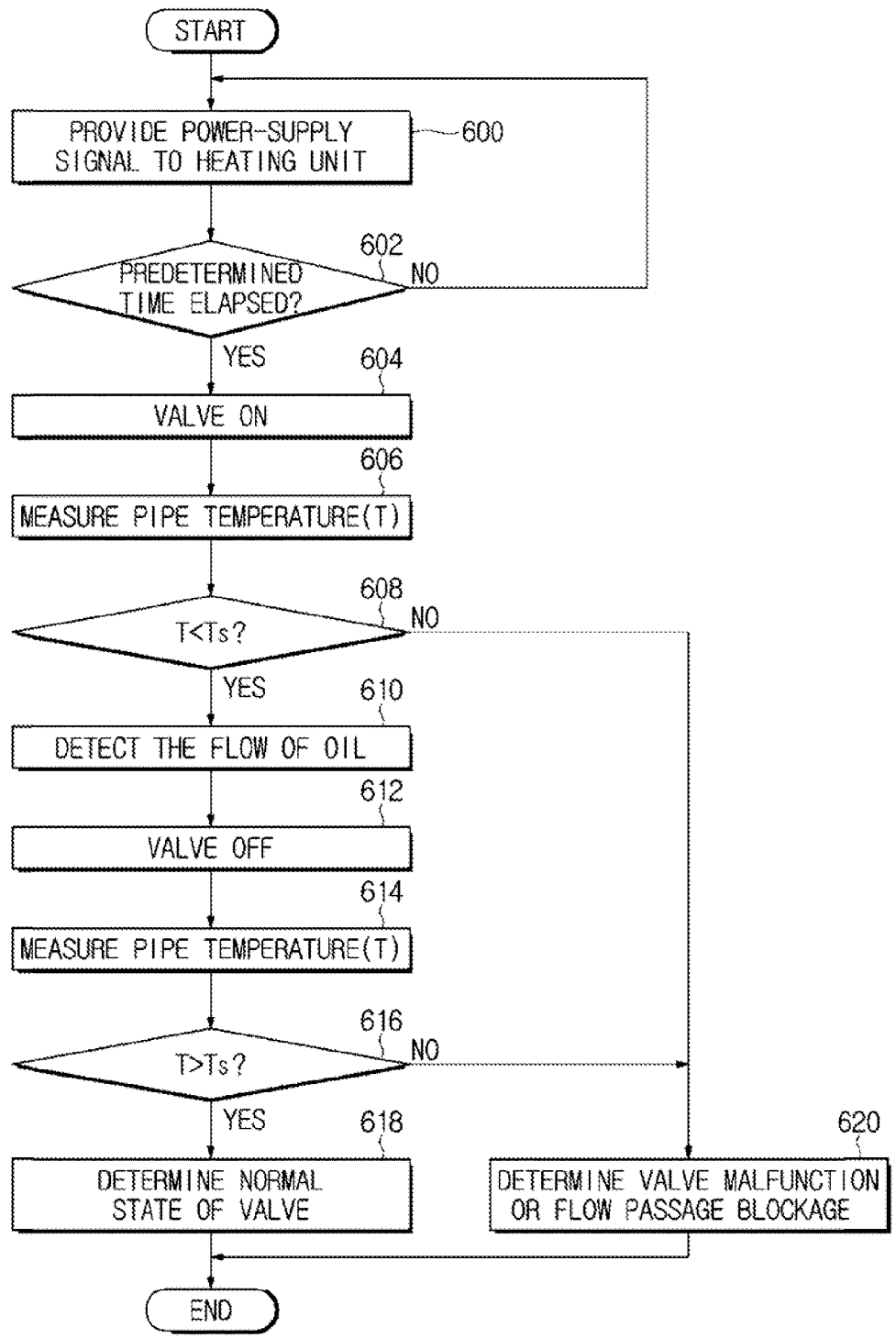
FIG. 17 is a flowchart illustrating a control method for detecting the flow of oil according to an embodiment of the present disclosure.

FIG. 17 is a flowchart illustrating a control method for detecting the flow of oil according to an embodiment of the present disclosure.

Referring to FIG. 17, the controller 330 of the oil flow detection apparatus 300 may provide a power-supply signal to the heating unit 310 through a power-supply unit 332 so as to heat the pipe 420 of the flow passage 400 in operation 600.

If the power-supply signal is supplied to the heating unit 310, the external part of the pipe 420 starts heating (about 5 W). If the pipe 420 is not heated, information as to whether the flow of oil can be confirmed is determined according to an outdoor temperature, such that there is a need to heat the pipe 420.

The operation condition needed for heating the pipe 420 is a low difference between the outdoor temperature and the evaporation temperature.

In this case, the controller 330 may count a predetermined time during which a power-supply signal is supplied to the heating unit 310, and may determine whether a predetermined time (needed for stably maintaining a pipe temperature) has elapsed in operation 602.

Although the embodiment of the present disclosure has exemplarily disclosed that a power-supply time for the heating unit 310 is counted to maintain a stable temperature of the pipe 420 for convenience of description and a better understanding of the present disclosure, it can be possible to determine whether the temperature of the pipe 420 can be stabilized by measuring the temperature of the pipe 420 without departing from the scope or spirit of the present disclosure.

In operation 602, if the predetermined time has not elapsed, the controller 330 may provide a power-supply signal to the heating unit 330 until reaching the predetermined time.

Meanwhile, if the predetermined time has elapsed in operation 602, the controller 330 may determine that the surface temperature of the pipe 420 is stably maintained, and a power-supply signal is supplied to the valve 410 through the power-supply unit 332, such that the valve 410 is turned on in operation 604.

If the valve 410 is turned on, the valve 410 is opened and the oil accumulated in the accumulator 430 flows into the pipe 420 through the valve 410, and the oil moves to the compressor 1.

If the oil starts flowing into the pipe 420, the surface temperature of the pipe 420 begins to change. In this case, the temperature measurement unit 320 measures the changed surface temperature (T) of the pipe 420, and transmits the measured surface temperature (T) to the controller 330 in operation 606.

Therefore, the controller 330 may compare the surface temperature (T) of the pipe 420 with a predetermined reference temperature (Ts: a reference temperature for determining whether oil flows into the pipe), and may determine whether the pipe temperature (T) is less than the reference temperature (Ts) in operation 608.

In this case, the pipe surface temperature (T) may include the surface temperature (T) of the pipe 420, and this pipe surface temperature (T) is changed to detect the flow of oil. In addition, the pipe surface temperature (T) may further include the other surface temperature (T) of the pipe 420, and the other surface temperature (T) may be measured within a predetermined section.

A reference temperature (surface temperature) condition for confirming whether the flow of oil stored in the pipe 420 exists may indicate one case in which a current temperature is higher than the outdoor temperature during the heating operation, and may indicate the other case in which a current temperature is higher than a predetermined temperature during the cooling operation.

If the pipe temperature (T) is less than the reference temperature (Ts) in operation 608, the controller 330 may determine that the oil flows into the pipe 420, such that the controller 330 may detect the flow of oil in operation 610. In more detail, if the valve 410 is turned on, the oil starts flowing into the pipe 420 such that the pipe temperature (T) is gradually reduced. As a result, the controller 330 can detect the flow of oil into the pipe 420.

As described above, the controller 330 may monitor temperature variation of the pipe 420, such that it can detect the presence or absence of the flow of oil into the pipe 420.

If the flow of oil is detected, the controller 330 may turn the valve 410 off through the power-supply unit 332 so as to determine the presence or absence of malfunction of the valve 410 in operation 612.

If the valve 410 is turned off, the valve 410 is turned off such that no oil flows into the pipe 420. In this case, the surface temperature (T) of the pipe 420 may be measured by the temperature measurement unit 320, and the measured surface temperature (T) is applied to the controller 330 in operation 614.

Therefore, the controller 330 may determine whether the surface temperature (T) of the pipe 420 is higher than the reference temperature (Ts) in operation 616.

In this case, the pipe temperature (T) may include the pipe surface temperature (T) that is changed to detect the presence or absence of a malfunction of the valve 410. In addition, the pipe temperature (T) may further include the pipe surface temperature (T) measured within a predetermined section.

If the pipe temperature (T) is higher than the reference temperature (Ts) in operation 616, the controller 330 determines that no oil flows into the pipe 420 such that it determines a normal state of the valve 410 in operation 618. In more detail, if the valve 410 is turned off, no oil flows into the pipe 420 and heat radiation is not smoothly achieved such that the pipe surface temperature (T) unavoidably increases. Because of the above-mentioned characteristics, the controller 330 can determine whether or not the valve 410 is normal in operation 618.

Meanwhile, if the pipe temperature (T) is not less than the reference temperature (Ts) in operation 608, the controller 330 determines that no oil flows into the pipe 420 such that it determines the occurrence of a malfunction of the valve 410 or a blockage of the flow passage 400 in operation 620. If the valve 410 is turned on, oil flows into the pipe 420 and, as such, the pipe temperature T must be reduced. However, if no oil flows into the pipe 420, and thus heat radiation is not smoothly achieved, the pipe temperature (T) unavoidably increases. Because of the above-mentioned characteristics, the controller 330 can determine whether malfunction of the valve 410 or blockage of the flow passage 400 occurs in operation 620.

If the pipe temperature (T) is not higher than the reference temperature (Ts) in operation 616, the controller 330 may determine that oil flows into the pipe 420 and thus determine the occurrence of a malfunction of the valve 410 in operation 620. If the valve 410 is turned off, no oil flows into the pipe 420, and heat radiation is not smoothly achieved such that the pipe temperature (T) must be increased. However, the controller 330 may determine that the pipe temperature (T) is not increased because the oil flows into the pipe 420 due to the valve malfunction.

As described above, the controller 330 may monitor temperature variation of the pipe 420 such that it can determine the presence or absence of malfunction of the valve 410 of the oil return flow passage 400.

A method for controlling the oil return operation not only using the detection result of the level of oil stored in the compressor 1 detected by the oil level detection apparatus 100 but also using the detection result of the flow of oil stored in the pipe 420 detected by the oil flow detection apparatus 300 will hereinafter be described with reference to FIG. 18.

Figure 18A:
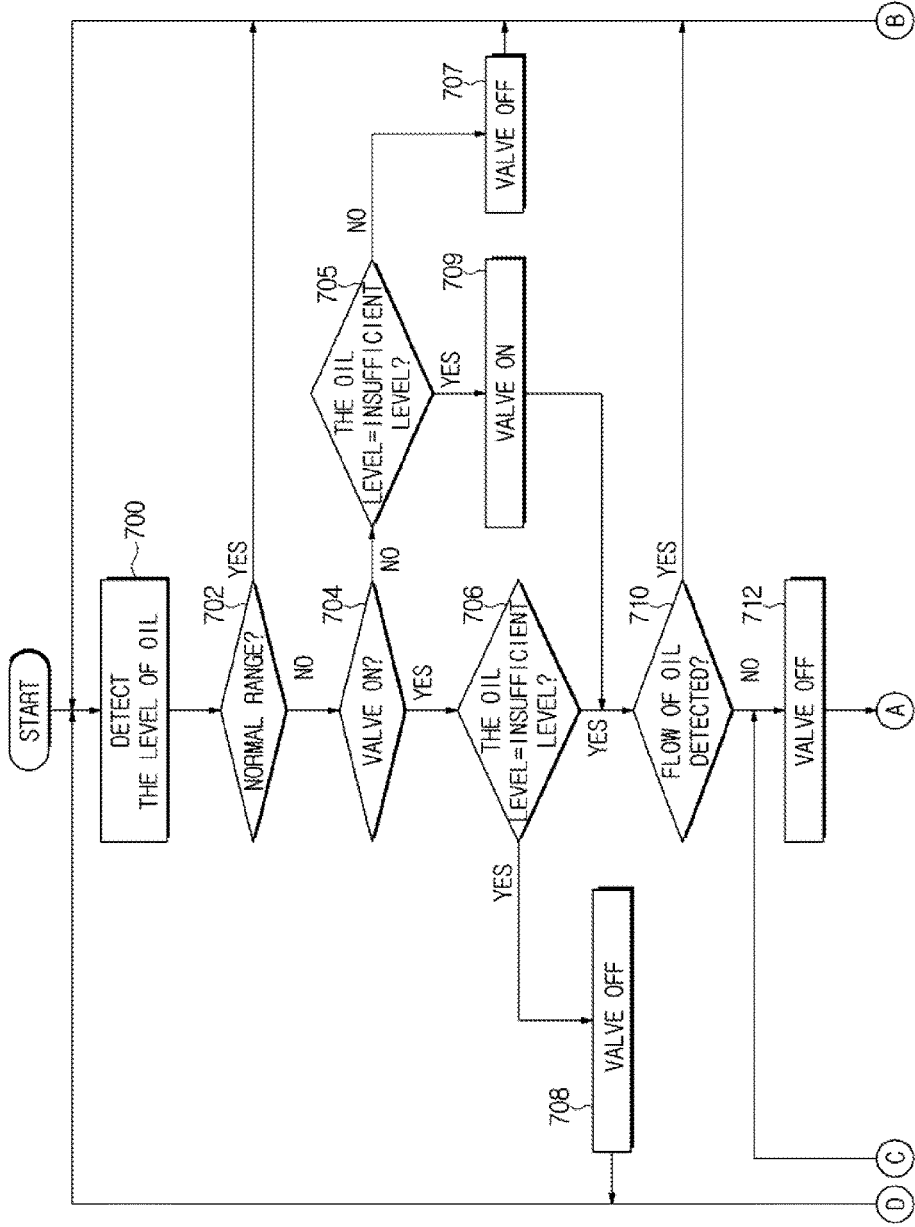
FIGS. 18A and 18B are flowcharts illustrating methods for controlling the oil return operation using the oil level and the oil flow detection result according to an embodiment of the present disclosure.
Figure 18B:
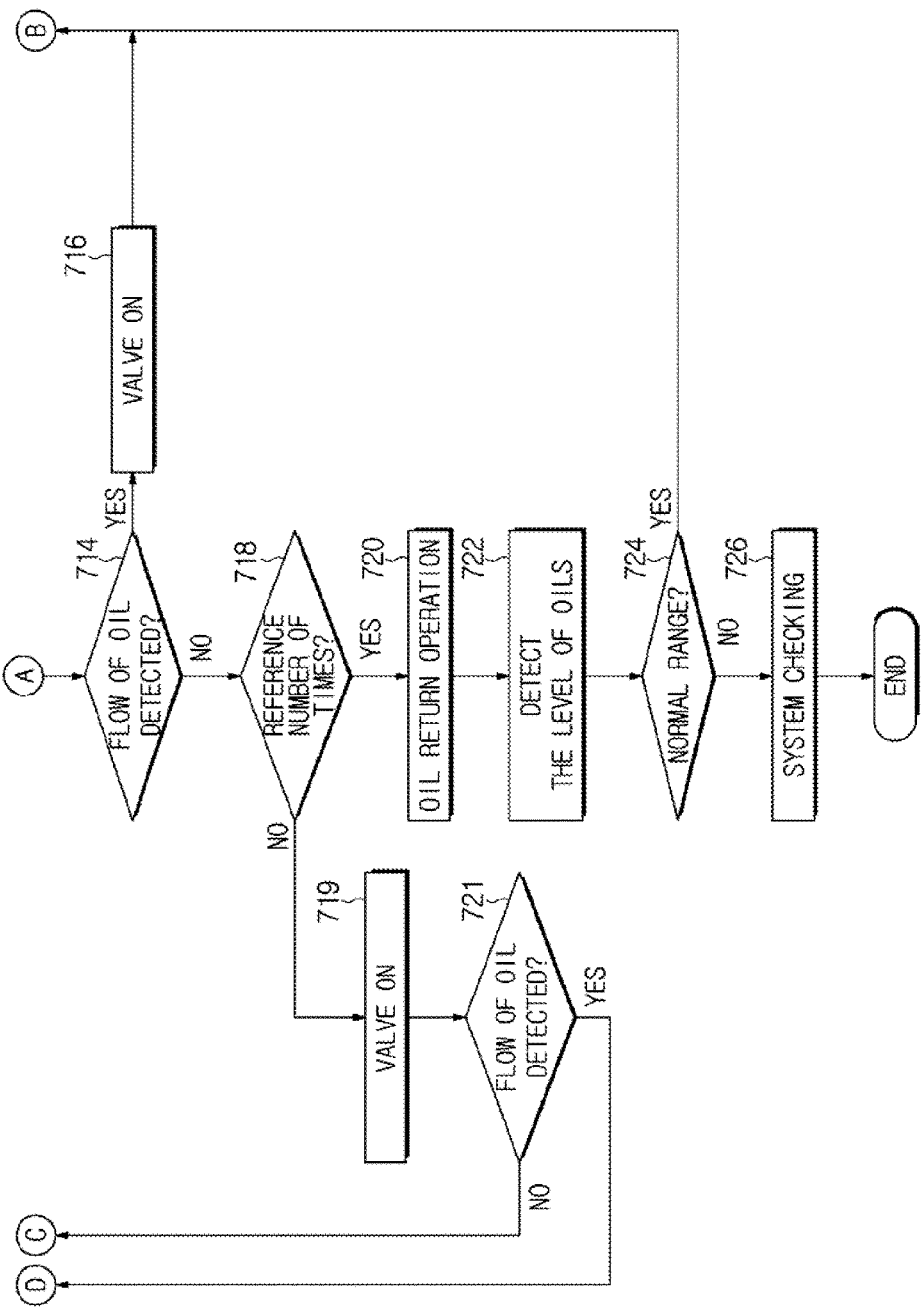

FIGS. 18A and 18B are flowcharts illustrating methods for controlling the oil return operation using the oil level and the oil flow detection result according to an embodiment of the present disclosure.

Prior to describing the method for controlling the oil return operation according to the embodiment, it is assumed that the controller 120 of the oil level detection apparatus 100 and the controller 330 of the oil flow detection apparatus 300 according to the embodiment are implemented as a single controller.

In FIGS. 18A and 18B, the level of oil stored in the compressor 1 is detected using the first and second detection portions (510, 520) of the oil level sensor 500, and the detected oil level is output to the controllers (120, 130) in operation 700.

Therefore, the controllers (120, 330) may determine whether the level of oil detected by the oil level detection apparatus 100 is in a normal range in operation 702. The normal range may indicate that the level of oil stored in the compressor 1 is between the first detection apparatus 510 and the second detection apparatus 520 of the oil level sensor 500.

In operation 702, if the level of oil is not in the normal range, the controllers (120, 330) may check a state of the valve 410 of the oil return flow passage 400, and determine whether the valve 410 is turned on in operation 704. If the level of oil is not in the normal range, this means that the level of oil stored in the compressor 1 is higher than the position of the first detection apparatus 510 of the oil level sensor 500 or is less than the position of the second detection apparatus 520 of the oil level sensor 500. That is, this means that the level of oil is at an excessive level or an insufficient level.

If the valve 410 is turned on in operation 704, the controllers (120, 330) may determine that the level of oil is at the insufficient level in operation 706.

If the level of oil is not at the insufficient level in operation 706, the controllers (120, 330) may determine that the level of oil is at the excessive level, turn the valve 410 off in operation 708, feed back to operation 700, and then perform a subsequent operation.

If the valve 410 is turned off, the valve 410 is closed, such that the flow of oil moving from the accumulator 430 to the compressor 1 is cut off.

If the level of oil is at the insufficient level in operation 706, the controllers (120, 330) may determine whether the oil flows into the pipe 420 of the oil return flow passage 400 using the oil flow detection apparatus 300 in operation 710.

If the flow of oil is detected in operation 710, the controllers (120, 330) may determine an execution state of the oil return control operation in which the oil accumulated in the accumulator 430 flow into the pipe 420 through the valve 410 and moves to the compressor 1, may feed back to operation 700, and may perform the subsequent operation.

If the flow of oil is not detected in operation 710, the controllers (120, 330) may turn the valve 410 off so as to determine the presence or absence of the flow of oil in operation 712.

If the valve 410 is turned off, the controllers (120, 330) may determine whether the oil flows into the pipe 420 of the oil return flow passage 400 in operation 714.

If the flow of oil is detected in operation 714, the controllers (120, 330) may turn the valve 420 on in operation 716, may feed back to operation 700, and may perform the subsequent operation.

If the valve 410 is turned on, the valve 410 is opened, such that the oil return control operation in which the oil accumulated in the accumulator 430 flows into the pipe 420 through the valve 410 and moves to the compressor 1 is performed.

If the flow of oil is not detected in operation 714, the controllers (120, 330) may determine whether the number of oil flow detection times is higher than a predetermined reference number of times (about 3 or more times) in operation 718. As a result, the oil can return to the inside of the compressor 1 through the oil return flow passage 400, prior to entering the oil return operation in which a long period of time is consumed and user inconvenience occurs. The oil return control through the oil return flow passage 400 can be performed only when the flow of oil into the pipe 420 is present, such that the oil flow detection operation is repeated at least a predetermined reference number of times.

If the oil flow detection operation is performed at least the reference number of times in operation 718, the controllers (120, 330) may enter the oil return operation in operation 720. If a connection pipe for interconnecting an indoor unit and an outdoor unit in an air-conditioning system (e.g., a large-scale air-conditioner or a multi-air conditioning system) having the compressor 1 increases in length, the time consumed for oil return increases, such that about 5 hours may be consumed for only one oil return operation.

The oil from the compressor 1, through the oil return operation, passes through the heat exchanger along with the refrigerant, and then returns to the compressor 1.

If the oil returns to the compressor 1 through the oil return operation, the controllers (120, 330) may detect the level of oil stored in the compressor 1 using the oil level detection apparatus in operation 722.

Subsequently, the controllers (120, 330) may determine whether the level of oil detected by the oil level detection apparatus 10 is in the normal range in operation 724.

If the level of oil is in the normal range in operation 724, the controllers (120, 330) may feed back to operation 700, and then perform the subsequent operation.

If the level of oil is not in the normal range in operation 724, the controllers (120, 330) may output a signal for checking the system in operation 726. Thus, the user may check the presence or absence of an error for system check, and may request after-sales service (A/S).

If the number of the oil flow detection operations is not higher than the reference number of times in operation 718, the controllers (120, 330) may turn the valve 410 on so as to detect the flow of oil in operation 719.

If the valve 410 is turned on, the oil return control operation in which the valve 410 is opened and the oil accumulated in the accumulator 430 flows in the pipe 420 through the valve 410 and moves to the compressor 1 is performed.

After the valve 410 is turned on, the controllers (120, 330) may determine whether the oil flows into the pipe 420 of the oil return flow passage 400 in operation 721.

If the flow of oil is not detected in operation 721, the controllers (120, 330) may feed back to operation 712 so as to turn the valve 420 off, and then perform the subsequent operation.

If the flow of oil is detected in operation 721, the controllers (120, 330) may feed back to operation 700, and then perform the subsequent operation.

If the valve 410 is turned off in operation 704, the controllers (120, 330) may determine whether the level of oil is the insufficient level in operation 705.

If the level of oil is not the insufficient level in operation 705, the controllers (120, 330) may determine that the level of oil is the excessive level so as to turn the valve 410 off in operation 707, and may feed back to the operation 700 and perform the subsequent operation.

If the valve 410 is turned off, the valve 410 is closed so that the flow of oil moving from the accumulator 430 to the compressor 1 is cut off.

If the level of oil is the insufficient level in operation 705, the controllers (120, 330) may turn the valve 410 on so as to detect the flow of oil in operation 709, and perform the subsequent operation in operation 710.

Figure 19:
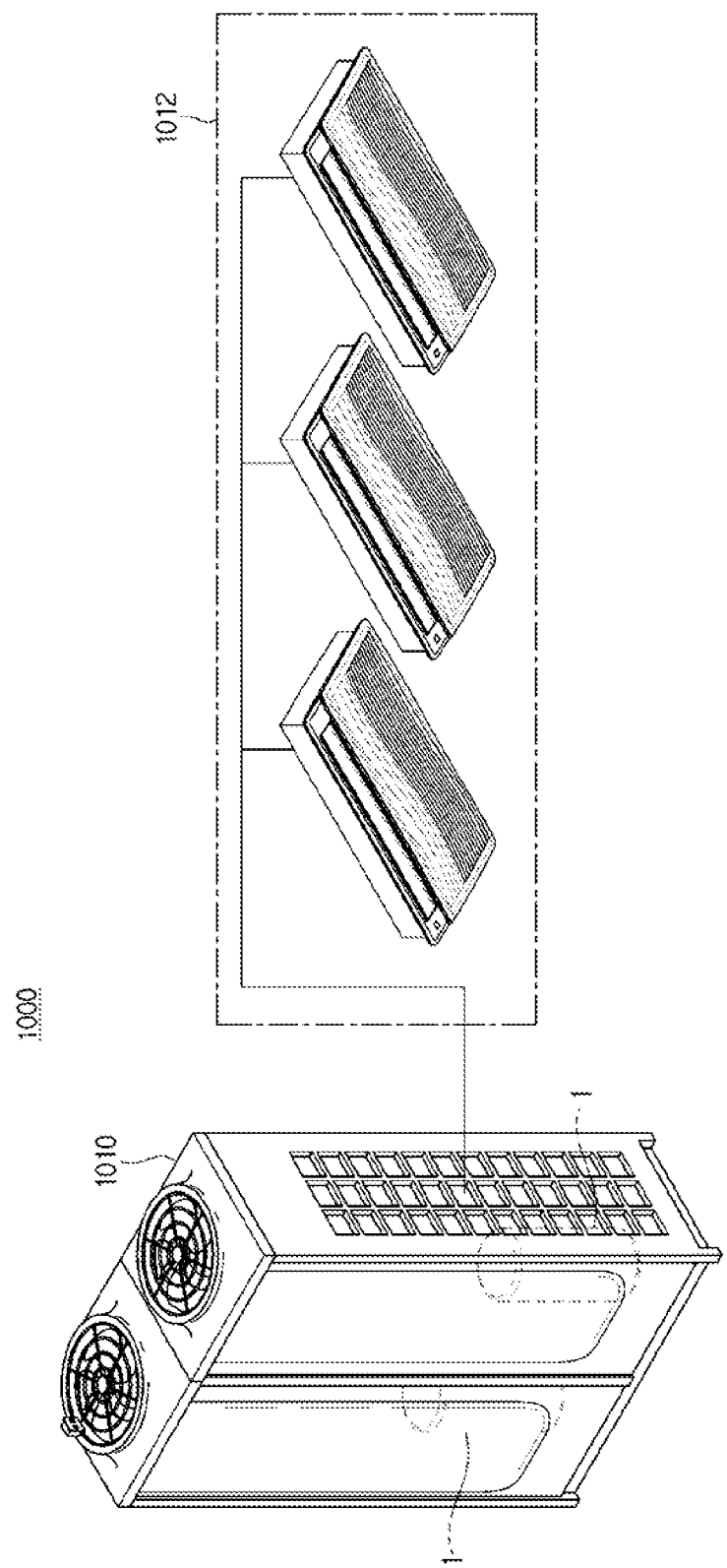
FIG. 19 is an exemplary view illustrating that a compressor including an oil level sensor and an oil flow detection device are mounted to an air-conditioning system according to an embodiment of the present disclosure.

FIG. 19 is an exemplary view illustrating that a compressor including an oil level sensor and an oil flow detection device is mounted to an air-conditioning system according to an embodiment of the present disclosure.

In FIG. 19, the air-conditioning system 1000 may include an outdoor unit 1010 installed outside and an indoor unit 1012 installed inside, and the outdoor unit 1010 and the indoor unit 1012 may be interconnected through a pipe.

The outdoor unit 1010 may include two or more compressors 1, each of which includes the oil level sensor 500.

Although not shown in the outdoor unit 1010, the controllers (120, 330), each of which includes the oil flow detection apparatus 300, may be mounted to the outdoor unit 1010 as necessary.

The indoor unit 1012 may include a plurality of indoor units installed in respective rooms so as to perform the heating or cooling operation.

Although the embodiments of the present disclosure have been disclosed for illustrative purposes, those skilled in the art will appreciate that various modifications, additions and substitutions are possible, without departing from the scope and spirit of the disclosure as disclosed in the accompanying claims.

Although the embodiment of the present disclosure has exemplarily disclosed the air-conditioning system 100 composed of the indoor unit 1020 and the outdoor unit 1010 for convenience of description and better understanding of the present disclosure, it should be noted that the same purposes and effects as those of the above-mentioned embodiment can also be achieved by the cooling system (e.g., a refrigerator) in which the compressor 1 is installed without departing from the scope or spirit of the present disclosure.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. An oil level detection apparatus comprising:
   an oil level sensor including at least a portion installed in an oil storage portion of a compressor and configured to measure a capacitance value that changes according to a level of oil contained in the oil storage portion at a plurality of positions;
   a signal processor configured to convert a plurality of capacitance values measured by the oil level sensor into a plurality of signals each having a frequency corresponding to a respective one of the measured plurality of capacitance values; and
   a controller configured to determine the level of oil on the basis of frequency of a signal of the plurality of signals received from the signal processor,
   wherein the signal processor is configured to convert voltage signals corresponding to a plurality of capacitance values measured by the oil level sensor into trigger frequency signals, and to output the trigger frequency signals, and
   wherein the controller is configured to compare a difference among a plurality of sensor output values generated from the oil level sensor with a reference value, and to determine a state of matter of the oil according to a result of the comparison.

2. The oil level detection apparatus according to claim 1, wherein the reference value is established to determine whether the state of matter of the oil contacting the oil level sensor is a liquid refrigerant, a bubble refrigerant, or a gaseous refrigerant.

3. The oil level detection apparatus according to claim 1, wherein at least the portion of the oil level sensor is installed the oil storage portion at a bottom portion of the compressor, and comprises a first detection portion and a second detection portion vertically spaced apart from each other by a predetermined distance within the oil storage portion.

4. The oil level detection apparatus according to claim 3, wherein the first detection portion comprises a first reference electrode and a first detection electrode arranged at both sides of the first reference electrode, and wherein the first detection portion determines whether the level of oil is equal to or higher than a first reference level.

5. The oil level detection apparatus according to claim 4, wherein the first detection electrode comprises:
 a first base portion spaced apart from one side of the first reference electrode by a first predetermined distance; and
 a first augmentation portion spaced apart from another side of the first reference electrode by a second predetermined distance.

6. The oil level detection apparatus according to claim 5, wherein the first detection portion outputs a first value corresponding to a capacitance between the first base portion and the first augmentation portion.

7. The oil level detection apparatus according to claim 3, wherein the second detection portion includes a second reference electrode spaced apart from the first reference electrode by a predetermined distance and a second detection electrode disposed respectively at each side of the second reference electrode, and wherein the second detection portion determines whether the level of oil is between the first reference level and the second reference level or is less than the second reference level.

8. The oil level detection apparatus according to claim 7, wherein the second detection electrode comprises:
 a second base portion spaced apart from one side of the second reference electrode by a third predetermined distance; and
 a second augmentation portion spaced apart from the other side of the second reference electrode by a fourth predetermined distance.

9. The oil level detection apparatus according to claim 8, wherein the second detection portion outputs a second value corresponding to a capacitance between the second base portion and the second augmentation portion.

10. The oil level detection apparatus according to claim 1, wherein the controller compares a difference among a plurality of sensor output values generated by the oil level sensor with a reference value, and determines the level of oil according to the result of comparison.

11. The oil level detection apparatus according to claim 10, wherein the reference value is established to determine whether the level of oil contacting the oil level sensor is in any one of a normal range, an excessive range, or an insufficient range.

12. The oil level detection apparatus according to claim 11, wherein the reference value includes:
 a first reference value for determining whether the level of oil is between the first detection portion and the second detection portion; and
 a second reference value for determining whether the level of oil is higher than the first detection portion.

13. The oil level detection apparatus according to claim 12, wherein the controller determines the level of oil using the first reference value and the second reference value.

14. The oil level detection apparatus according to claim 13, wherein the controller determines that the level of oil is in the normal range when a difference among the sensor output values generated from the oil level sensor is higher than the first reference value.

15. The oil level detection apparatus according to claim 13, wherein the controller determines that the level of oil is in the excessive range when a difference among the sensor output values generated from the oil level sensor is less than the second reference value.

16. The oil level detection apparatus according to claim 13, wherein the controller determines that the level of oil is in the insufficient range when a difference among the sensor output values generated from the oil level sensor is between the first reference value and the second reference value.

* * * * *

UNITED STATES PATENT AND TRADEMARK OFFICE
CERTIFICATE OF CORRECTION

PATENT NO. : 10,025,323 B2
APPLICATION NO. : 14/829747
DATED : July 17, 2018
INVENTOR(S) : Yong Hee Jang et al.

Page 1 of 1

It is certified that error appears in the above-identified patent and that said Letters Patent is hereby corrected as shown below:

In the Claims

Column 35, Line 10, In Claim 3, delete "installed" and insert -- installed in --, therefore.

Signed and Sealed this
Sixteenth Day of October, 2018

Andrei Iancu
*Director of the United States Patent and Trademark Office*